United States Patent
Chen et al.

(10) Patent No.: US 11,239,663 B2
(45) Date of Patent: Feb. 1, 2022

(54) ENERGY STORAGE DEVICE AND POWER SYSTEM AND CONTROL METHOD THEREOF

(71) Applicant: Delta Electronics (Shanghai) Co., Ltd., Shanghai (CN)

(72) Inventors: Li Chen, Shanghai (CN); Changyong Wang, Shanghai (CN); Yansong Lu, Shanghai (CN); Aibin Qiu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/190,288

(22) Filed: Mar. 2, 2021

(65) Prior Publication Data
US 2021/0281072 A1  Sep. 9, 2021

(30) Foreign Application Priority Data
Mar. 9, 2020 (CN) .......................... 202010157585.3

(51) Int. Cl.
*H02J 3/32* (2006.01)
*H02J 7/00* (2006.01)
(Continued)

(52) U.S. Cl.
CPC .............. *H02J 3/32* (2013.01); *H02J 7/0068* (2013.01); *H02J 7/02* (2013.01); *H02M 7/219* (2013.01); *H02M 7/5387* (2013.01)

(58) Field of Classification Search
CPC .... H02J 3/32; H02J 7/0068; H02J 7/02; H02J 7/00; H02M 7/219; H02M 7/5387
See application file for complete search history.

(56) References Cited

U.S. PATENT DOCUMENTS

| 10,116,159 | B1 | 10/2018 | Li et al. |
| 10,404,181 | B2 | 9/2019 | Zhou et al. |
| 2013/0076293 | A1 | 3/2013 | Chen et al. |

FOREIGN PATENT DOCUMENTS

| CN | 102064702 A | 5/2011 |
| CN | 103219740 A | 7/2013 |

(Continued)

OTHER PUBLICATIONS

Research on Control Technology of Applying Storage-Based Farm as Black-Start Power Source for Power Grid, Jun. 2017.
(Continued)

*Primary Examiner* — Robert L Deberadinis
(74) *Attorney, Agent, or Firm* — Kirton McConkie; Evan R. Witt

(57) ABSTRACT

An energy storage device for a power system is provided. The energy storage device is electrically connected with a high voltage DC transmission grid. The energy storage device includes at least one energy storage element, at least one bidirectional inverter module, at least one medium frequency transformer and at least one bidirectional AC/DC conversion module. A DC terminal of each bidirectional inverter module is electrically connected with the corresponding energy storage element. A first transmission terminal of each medium frequency transformer is electrically connected with an AC terminal of the corresponding bidirectional inverter module. An AC terminal of each bidirectional AC/DC conversion module is electrically connected with a second transmission terminal of the corresponding medium frequency transformer. A DC terminal of each bidirectional AC/DC conversion module is electrically connected with the high voltage DC transmission grid.

27 Claims, 24 Drawing Sheets

(51) Int. Cl.
  *H02J 7/02* (2016.01)
  *H02M 7/219* (2006.01)
  *H02M 7/5387* (2007.01)

(56) References Cited

FOREIGN PATENT DOCUMENTS

| | | |
|---|---|---|
| CN | 203398807 U | 1/2014 |
| CN | 103986339 A | 8/2014 |
| CN | 104242341 A | 12/2014 |
| CN | 204145305 U | 2/2015 |
| CN | 104410095 B | 11/2015 |
| CN | 105790305 A | 7/2016 |
| CN | 103891121 B | 11/2016 |
| CN | 107026463 A | 8/2017 |
| CN | 107294130 A | 10/2017 |
| CN | 104917393 B | 2/2018 |
| CN | 105262125 B | 2/2018 |
| CN | 108134409 A | 6/2018 |
| CN | 108631293 A | 10/2018 |
| CN | 108988667 A | 12/2018 |
| CN | 109103911 A | 12/2018 |
| CN | 109742780 A | 5/2019 |
| CN | 209298898 U | 8/2019 |
| CN | 110247421 A | 9/2019 |
| CN | 110266034 A | 9/2019 |
| CN | 110460101 A | 11/2019 |
| CN | 110768240 A | 2/2020 |
| CN | 110829479 A | 2/2020 |
| EP | 2919354 A1 | 9/2015 |
| JP | 2014176163 A | 9/2014 |
| SE | 1750290 A1 | 4/2017 |
| TW | 201220632 A | 5/2012 |
| TW | 201308817 A | 2/2013 |
| TW | 201315094 A | 4/2013 |
| TW | 201806279 A | 2/2018 |
| TW | 201820735 A | 6/2018 |
| WO | 2014026840 A2 | 2/2014 |

OTHER PUBLICATIONS

Guan Zhou et al., Modular Multilevel DC Transformer for DC Distribution Application Based on Extended Phase-Shift Control, Transactions of China Electrotechnical Society, Jul. 2019, pp. 2770-2781, vol. 34, No. 13.

ENERGY STORAGE DEVICE AND POWER SYSTEM AND CONTROL METHOD THEREOF

CROSS-REFERENCE TO RELATED APPLICATION

This application claims priority to China Patent Application No. 202010157585.3, filed on Mar. 9, 2020, the entire contents of which are incorporated herein by reference for all purposes.

FIELD OF THE INVENTION

The present disclosure relates to an energy storage device, and more particularly to an energy storage device with reduced volume and cost, a power system and a control method.

BACKGROUND OF THE INVENTION

With the rapid development of new energy power generation technologies, various power systems are gradually connected to the electric grid. Before the power system is connected to the AC grid, long-distance AC cables must be used to perform long-distance power transmission. Consequently, the transmission efficiency is low, and the cost is high. At present, in some power systems, such as some offshore wind farms, the distance between the wind turbine and the onshore substation is very far. For reducing the transmission loss and the cost, the wind turbine is connected to the high voltage DC transmission grid first and adopts high-voltage direct current (HVDC) electric power transmission.

For allowing the high voltage DC transmission grid to have the function of dispatching and regulating electric energy, an additional energy storage device is connected to the high voltage DC transmission grid. Due to the energy storage device, the function of dispatching and regulating electric energy can be achieved. For converting a low voltage into a high DC voltage, the connected energy storage device needs to have a transformer with a high set-up ratio to boost the three-phase low AC voltage from an energy storage inverter into a high AC voltage, and needs to have a high-voltage bidirectional converter to convert the three-phase high AC voltage into high DC voltage and feed the high DC voltage to the DC transmission grid. Since some components of the energy storage device are bulky and costly, the volume of the energy storage device is large and the cost of the energy storage device is high.

Therefore, there is a need of providing an improved energy storage device, an improved power system and an improved control method in order to overcome the drawbacks of the conventional technologies.

SUMMARY OF THE INVENTION

The present disclosure provides an energy storage device, a power system and a control method. The energy storage device uses a medium frequency transformer. Consequently, the volume and cost of the transformer are reduced. Moreover, since a bidirectional AC/DC conversion module of the energy storage device is connected with the medium frequency transformer, the volume and cost of the bidirectional AC/DC conversion module are also reduced. Consequently, the volume and the cost of the energy storage device are reduced.

In accordance with an aspect of the present disclosure, an energy storage device for a power system is provided. The energy storage device is electrically connected with a high voltage DC transmission grid. The energy storage device includes at least one energy storage element, at least one bidirectional inverter module, at least one medium frequency transformer and at least one bidirectional AC/DC conversion module. A DC terminal of each bidirectional inverter module is electrically connected with the corresponding energy storage element. A first transmission terminal of each medium frequency transformer is electrically connected with an AC terminal of the corresponding bidirectional inverter module. An AC terminal of each bidirectional AC/DC conversion module is electrically connected with a second transmission terminal of the corresponding medium frequency transformer. A DC terminal of each bidirectional AC/DC conversion module is electrically connected with the high voltage DC transmission grid.

In accordance with another aspect of the present disclosure, a power system is provided. The power system includes a power generator and an energy storage device. The power generator is electrically connected with a high voltage DC transmission grid. The energy storage device is electrically connected with the high voltage DC transmission grid. The energy storage device includes at least one energy storage element, at least one bidirectional inverter module, at least one medium frequency transformer and at least one bidirectional AC/DC conversion module. A DC terminal of each bidirectional inverter module is electrically connected with the corresponding energy storage element. A first transmission terminal of each medium frequency transformer is electrically connected with an AC terminal of the corresponding bidirectional inverter module. An AC terminal of each bidirectional AC/DC conversion module is electrically connected with a second transmission terminal of the corresponding medium frequency transformer. A DC terminal of each bidirectional AC/DC conversion module is electrically connected with the high voltage DC transmission grid.

In accordance with a further aspect of the present disclosure, a control method for a power system is provided. The power system includes a power generator and an energy storage device. The power generator and the energy storage device are electrically connected with a high voltage DC transmission grid. The energy storage device includes at least one energy storage element, at least one bidirectional inverter module, at least one medium frequency transformer and at least one bidirectional AC/DC conversion module. A DC terminal of each bidirectional inverter module is electrically connected with the corresponding energy storage element. A first transmission terminal of each medium frequency transformer is electrically connected with an AC terminal of the corresponding bidirectional inverter module. An AC terminal of each bidirectional AC/DC conversion module is electrically connected with a second transmission terminal of the corresponding medium frequency transformer. A DC terminal of each bidirectional AC/DC conversion module is electrically connected with the high voltage DC transmission grid. The control method includes the following steps. In a step (S1), an operation mode of the energy storage device is determined. In a step (S2), when the power generator generates electric energy, the energy storage device is operated in a grid-connected mode, and the energy storage device regulates electric energy in the high voltage DC transmission grid. In a step (S3), when the power generator does not generate electric energy, the energy storage device is operated in an off-grid mode, and the energy storage device provides auxiliary electric energy to the power generator.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
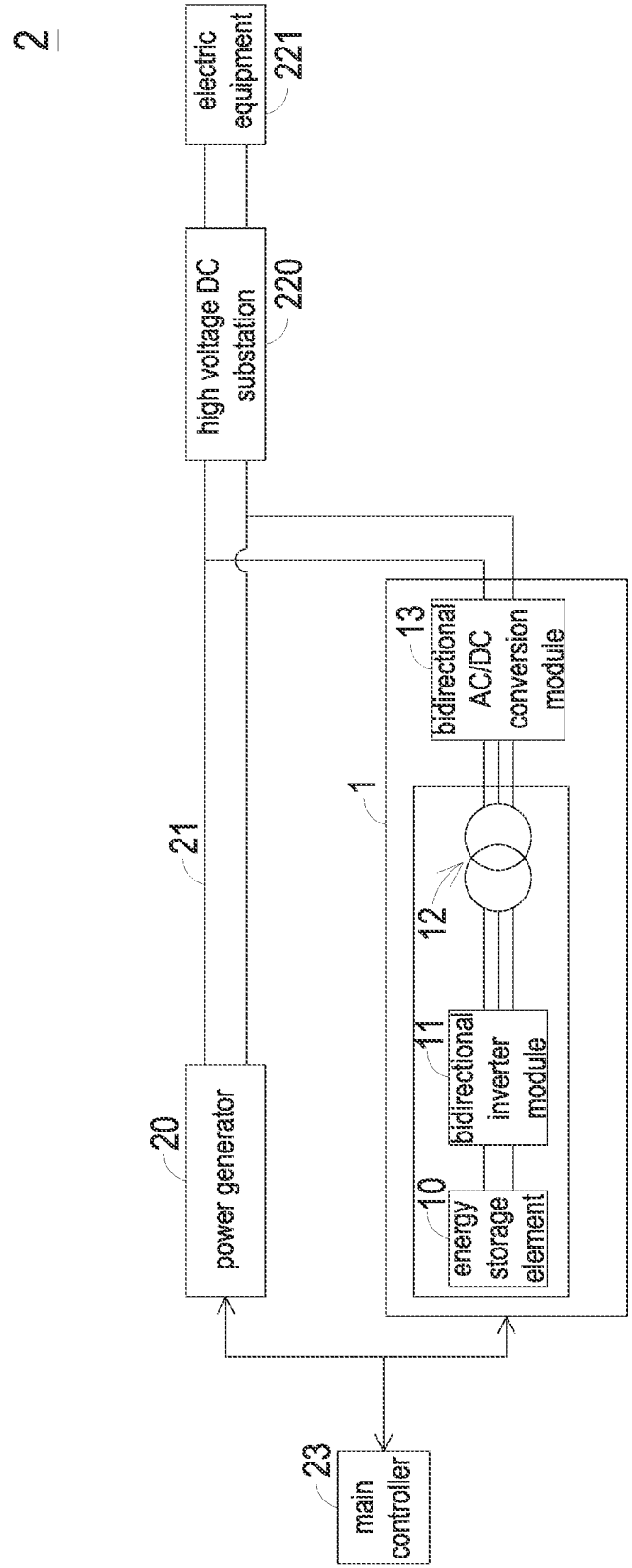
FIG. 1 is a schematic circuit diagram illustrating an energy storage device for a power system according to a first embodiment of the present disclosure.

FIG. 1 is a schematic circuit diagram illustrating an energy storage device for a power system according to a first embodiment of the present disclosure. As shown in FIG. 1, the energy storage device 1 is applied to the power system 2. The power system 2 includes a power generator 20, a high voltage DC transmission grid 21 and the energy storage device 1. The high voltage DC transmission grid 21 is connected with a high voltage DC substation 220. The received DC voltage is converted into a high voltage by the high voltage DC substation 220, and the converted high voltage is transmitted to the downstream electric equipment 221. Preferably but not exclusively, the power generator 20 is a photovoltaic power generation apparatus or a wind power generation apparatus. The power generator 20 is electrically connected with the high voltage DC transmission grid 21. The energy storage device 1 is electrically connected to the high voltage DC transmission grid 21 to achieve the function of dispatching and regulating the electric energy of the high voltage DC transmission grid 21.

In some embodiments, the power system 2 is applied to an offshore wind power project, and the power generator 20 is a wind power generator in a wind power plant. The wind power generator generates the high DC voltage (e.g., 30 kV or 60 kV). The high DC voltage is transmitted to the offshore high voltage DC substation 220 through the high voltage DC transmission grid 21.

The energy storage device 1 is electrically connected with the high voltage DC transmission grid 21. When the power generator 20 generates electric energy, the energy storage device 1 is operated in a grid-connected mode. In the grid-connected mode, the energy storage device 1 has the function of regulating and dispatching the high voltage DC transmission grid 21. When the power generator 20 does not generate electric energy, the energy storage device 1 is operated in an off-grid mode. In the off-grid mode, the energy storage device 1 provides auxiliary electric energy to the power generator 20. When the energy storage device 1 is operated in the off-grid mode and the capacity of the energy storage device 1 is sufficient, the energy storage device 1 can simultaneously supply power to the downstream electric equipment 221. Take the offshore wind power application as an example. When there is no wind in the environment, the power generator 20 (i.e., the wind turbine) is in a standby mode. Since some systems in the wind turbine need to be ready to start at any time according to the wind speed, the energy storage device 1 provides auxiliary electric power to the wind turbine. In this way, the wind turbine can be started at any time according to the wind speed.

The energy storage device 1 includes at least one energy storage element 10, at least one bidirectional inverter module 11, at least one medium frequency transformer 12 and at least one bidirectional AC/DC conversion module 13. Preferably but not exclusively, the energy storage element 10 is a battery or a capacitor. The bidirectional inverter module 11 has a DC terminal and an AC terminal. The DC terminal of the bidirectional inverter module 11 is electrically connected with the corresponding energy storage element 10. The medium frequency transformer 12 has a first transmission terminal and a second transmission terminal. The first transmission terminal of the medium frequency transformer 12 is electrically connected with the AC terminal of the corresponding bidirectional inverter module 11. Preferably but not exclusively, the working frequency of the medium frequency transformer 12 is 400 Hz. The bidirectional AC/DC conversion module 13 has an AC terminal and a DC terminal. The AC terminal of the bidirectional AC/DC conversion module 13 is electrically connected with the second transmission terminal of the corresponding medium frequency transformer 12. The DC terminal of the bidirectional AC/DC conversion module 13 is electrically connected with the high voltage DC transmission grid 21.

As mentioned above, the energy storage device 1 uses the medium frequency transformer 12. Since the medium frequency transformer 12 has a higher working frequency than a general power frequency transformer, the volume and cost of the transformer can be reduced. Moreover, since the energy storage device 1 uses the medium frequency transformer 12, the bidirectional AC/DC conversion module 13 is correspondingly a medium frequency converter and the volume and cost of the bidirectional AC/DC conversion module 13 are reduced. For example, the volume and cost about the inductor, the capacitor and other associated components are reduced. Consequently, the volume and the cost of the energy storage device 1 are reduced.

If the electric energy provided by the power generator 20 is greater than the required electric energy of the power equipment 221 when the energy storage device 1 is operated in the grid-connected mode, the energy storage element 10 of the energy storage device 1 is charged by the electric energy from the high voltage DC transmission grid 21. The operations of the energy storage device 1 will be described as follows. Firstly, the voltage on the high voltage DC transmission grid 21 (e.g., 30 kV or 60 kV) is converted into an AC voltage with a first voltage level (e.g., 18 kV or 36 kV) by the bidirectional AC/DC conversion module 13. Then, the AC voltage with the first voltage level is decreased to an AC voltage with a second voltage level (e.g., 480V) by the medium frequency transformer 12. Then, the AC voltage with the second voltage level is converted into a DC charging voltage by the bidirectional inverter module 11. Consequently, the energy storage element 10 is charged by the DC charging voltage.

If the electric energy provided by the power generator 20 is lower than the required electric energy of the power equipment 221 when the energy storage device 1 is operated in the grid-connected mode, the energy storage element 10 of the energy storage device 1 provides the electric energy to the high voltage DC transmission grid 21. The operations of the energy storage device 1 will be described as follows. Firstly, the energy storage voltage of the energy storage element 10 is converted into the AC voltage with the second voltage level by the bidirectional inverter module 11. Then, the AC voltage with the second voltage level is increased to the AC voltage with the first voltage level by the medium frequency transformer 12. Then, the AC voltage with the first voltage level is converted into the high DC voltage by the bidirectional AC/DC conversion module 13. Then, the high DC voltage is fed into the high voltage DC transmission grid 21.

When the energy storage device 1 is operated in the off-grid mode, the operations of the energy storage device 1 is similar to the situation that the energy storage device 1 is operated in the grid-connected mode and the electric energy provided by the power generator 20 is lower than the required electric energy of the power equipment 221. The associated operations will not be redundantly described herein. However, when the energy storage device 1 is operated in the off-grid mode, the energy storage device 1 still provides the auxiliary electric energy to the power generator 20.

In an embodiment, the power system 2 further includes a main controller 23. The main controller 23 detects the output power of the power generator 20 and calculates a power command of the energy storage device 1 according to a grid dispatch command. Consequently, the main controller 23 controls the charging and discharging operations of the energy storage device 1, and the power generator 20 generates the fixed output power. Alternatively, the main controller 23 calculates the power command of the energy storage device 1 according to an upper-level control command in order to control the charging and discharging operations of the energy storage device 1. Consequently, the peak-shaving and valley-filling function and the function of smoothing the new energy source can be achieved. That is, the strategy of controlling the energy storage device 1 can flexibly adjust the power distribution in the power system 2.

In an embodiment, the main controller 23 detects the generated power of the power generator 20 and filters and smooths the generated power to obtain a target power. After the generated power is subtracted from the target power, a difference value is obtained. According to the difference value, the main controller 23 adjusts the power command of each energy storage unit of the energy storage device 1 (e.g., the energy storage element 10 and the corresponding bidirectional inverter module 11 and the corresponding medium frequency transformer 12). Consequently, the main controller 23 controls the charging and discharging operations of the energy storage unit and smooths the power fluctuations. In this way, the actual power of the high voltage DC transmission grid 21 is consistent with the target power.

In some embodiments, the main controller 23 can dispatch the electric energy according to the load demand and the power generation condition of the power generator 20. Consequently, the energy storage device 1 can be controlled to achieve the energy time shift function. For example, when the electric energy provided by the power generator 20 is large and the load demand is small, the surplus electric energy can be stored in the energy storage element 10 of the energy storage device 1. Whereas, when the electric energy provided by the power generator 20 is low and the load demand is large, the energy stored in the energy storage element 10 can be released and supplied to the high voltage DC transmission grid 21.

In some embodiments, in case that the high voltage DC transmission grid 21 is required to output the fixed power, the main controller 23 detects the output power of the power generator 20. After the output power of the power generator 20 is subtracted from the target power with the fixed power, the power command of the energy storage device 1 is obtained. According to the state-of-charge (SOC) of the energy storage elements 10, the power command of the energy storage device 1 is allocated to all energy storage units. Since the main controller 23 controls the charging and discharging operations of the energy storage device 1, the function of producing the fixed output power is achieved.

When the energy storage device 1 is in the off-grid mode, the electric energy stored in the energy storage element 10 can be released and supplied to the high voltage DC transmission grid 21 to provide the auxiliary electric energy to the power generator 20. Specifically, the DC voltage from the energy storage element 10 is converted into an AC voltage with the second voltage level (e.g., 660V or 480V) by the bidirectional inverter module 11. The AC voltage with the second voltage level is increased into an AC voltage with the first voltage level by the medium frequency transformer 12. The AC voltage with the first voltage level is transmitted to the bidirectional AC/DC conversion module 13. After the AC voltage with the first voltage level is converted into a high DC voltage by the bidirectional AC/DC conversion module 13, the high DC voltage is fed into the high voltage DC transmission grid 21 to provide the auxiliary electric energy to the power generator 20. Meanwhile, in case that the capacity of the energy storage device 1 is sufficiently large, a portion of the electric energy released from the energy storage device 1 is transmitted to the high voltage DC substation 220 through the high voltage DC transmission grid 21 in order to power the downstream power equipment 221.

Figure 2:
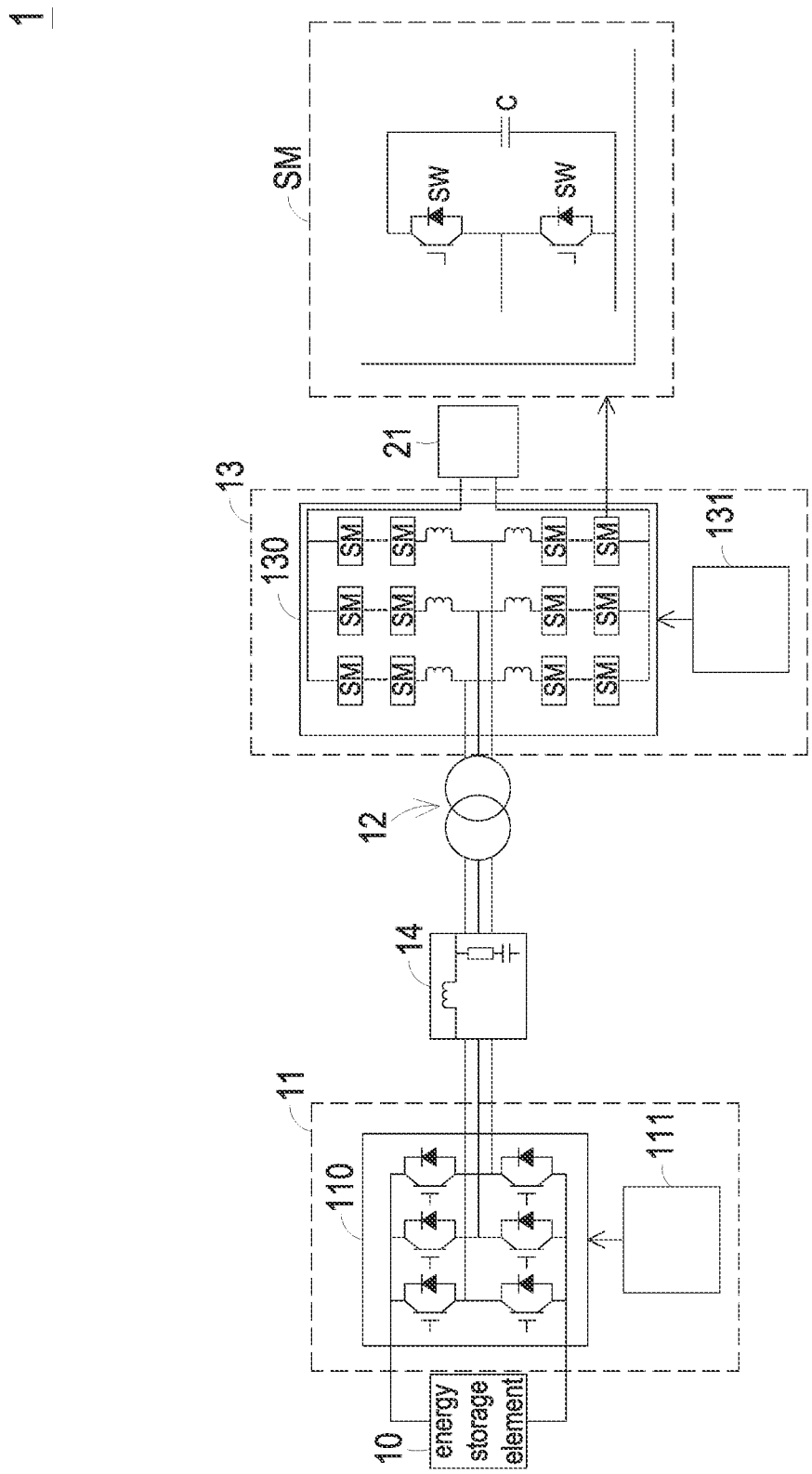
FIG. 2 is a schematic circuit diagram illustrating the detailed circuitry structure of the energy storage device as shown in FIG. 1.

FIG. 2 is a schematic circuit diagram illustrating the detailed circuitry structure of the energy storage device as shown in FIG. 1. In an embodiment, the bidirectional AC/DC conversion module 13 includes a modular multilevel converter 130 and a first controller 131. The modular multilevel converter 130 includes a plurality of bridge arms. Each bridge arm includes a plurality of serially connected switch modules SM. Each switch module SM includes two switch elements SW and a capacitor C. The two switch elements SW are electrically connected with each other in series. The capacitor C is electrically connected with the two switch elements SW. The first controller 131 is electrically connected with the modular multilevel converter 130 for controlling the switching operation of the modular multilevel converter 130.

Each of the first transmission terminal and the second transmission terminal of the medium frequency transformer 12 has a single winding. The winding on the second transmission terminal of the medium frequency transformer 12 is electrically connected with the modular multilevel converter 130.

The bidirectional inverter module 11 includes an inverter 110 and a second controller 111. The inverter 110 is electrically connected with the energy storage element 10 and the winding on the first transmission terminal of the medium frequency transformer 12. The second controller 111 is electrically connected with the inverter 110 for controlling the switching operation of the inverter 110.

It is noted that the circuitry structures of the modular multilevel converter 130 and the inverter 110 are not restricted to those as shown in FIG. 2. That is, the circuitry structures of the modular multilevel converter 130 and the inverter 110 may be varied according to the practical requirements. For example, in another embodiment, the modular multilevel converter 130 is a medium frequency modular multilevel converter. Alternatively, the bidirectional AC/DC conversion module 13 includes a plurality of converters to replace the modular multilevel converter 130.

In an embodiment, the energy storage device 1 further includes a filter 14. The filter 14 is electrically connected between the bidirectional inverter module 11 and the medium frequency transformer 12. The output current from the bidirectional inverter module 11 or the current on the first transmission terminal of the medium frequency transformer 12 can be filtered by the filter 14.

Figure 3A:
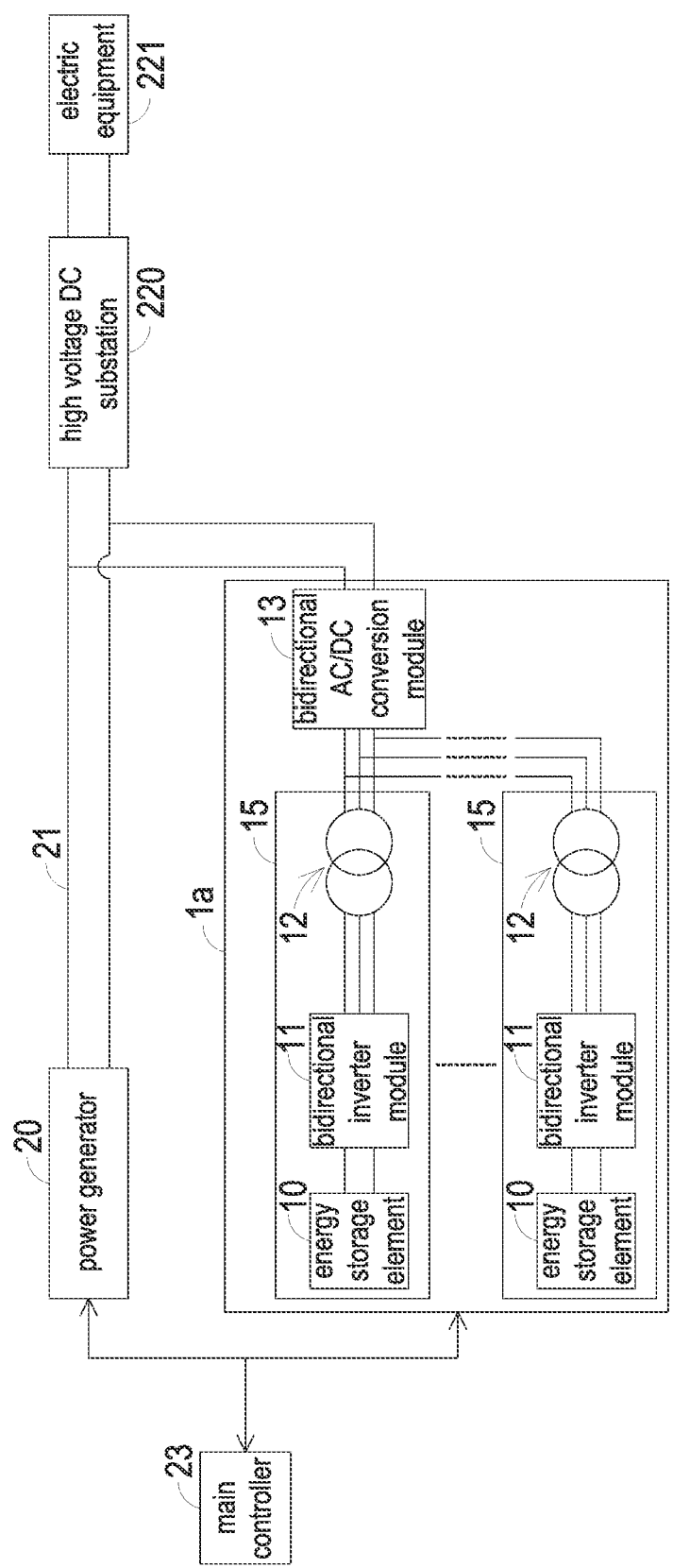
FIG. 3A is a schematic circuit diagram illustrating an energy storage device for a power system according to a second embodiment of the present disclosure.

FIG. 3A is a schematic circuit diagram illustrating an energy storage device for a power system according to a second embodiment of the present disclosure. As shown in FIG. 3A, the energy storage device 1*a* includes a plurality of energy storage elements 10, a plurality of bidirectional inverter modules 11, a plurality of medium frequency transformers 12 and a bidirectional AC/DC conversion module 13. Each energy storage element 10, the corresponding bidirectional inverter module and the corresponding medium frequency transformer 12 are collaboratively formed as an energy storage unit 15. The second transmission terminals of the medium frequency transformers 12 of the plurality of energy storage units 15 are connected with the AC terminal of the bidirectional AC/DC conversion module 13 in parallel. Since the energy storage device 1*a* includes a plurality of energy storage units 15, the energy storage capacity and the power supply capacity of energy storage device 1*a* are enhanced. In an embodiment, the main controller 23 can also allocate the power commands of the energy storage units 15 according to the state-of-charge (SOC) of the energy storage elements 10 in different energy storage units 15.

Figure 3B:
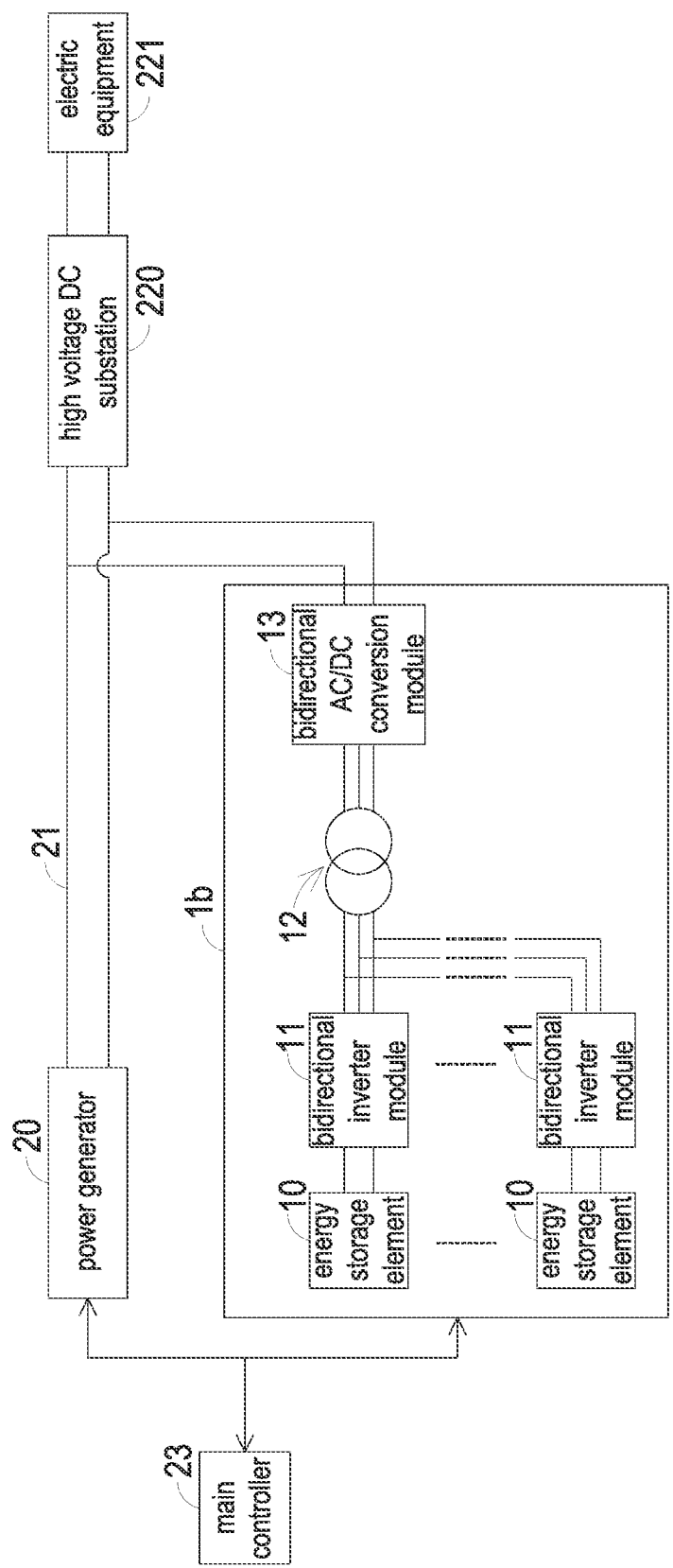
FIG. 3B is a schematic circuit diagram illustrating an energy storage device for a power system according to a third embodiment of the present disclosure.

FIG. 3B is a schematic circuit diagram illustrating an energy storage device for a power system according to a third embodiment of the present disclosure. As shown in FIG. 3B, the energy storage device 1*b* includes a plurality of energy storage elements 10, a plurality of bidirectional inverter modules 11, a medium frequency transformer 12 and a bidirectional AC/DC conversion module 13. In comparison with the embodiment of FIG. 3A, the energy storage device 1*b* of this embodiment includes a single medium frequency transformer 12. The AC terminals of the plurality of bidirectional inverter modules 11 are electrically connected with the first transmission terminal of the medium frequency transformer 12 in parallel. The second transmission terminal of the medium frequency transformer 12 is electrically connected with the AC terminal of the bidirectional AC/DC conversion module 13. Preferably, the bidirectional AC/DC conversion module 13 of this embodiment further includes a multilevel converter such as a modular multilevel converter (MMC).

Figure 3C:
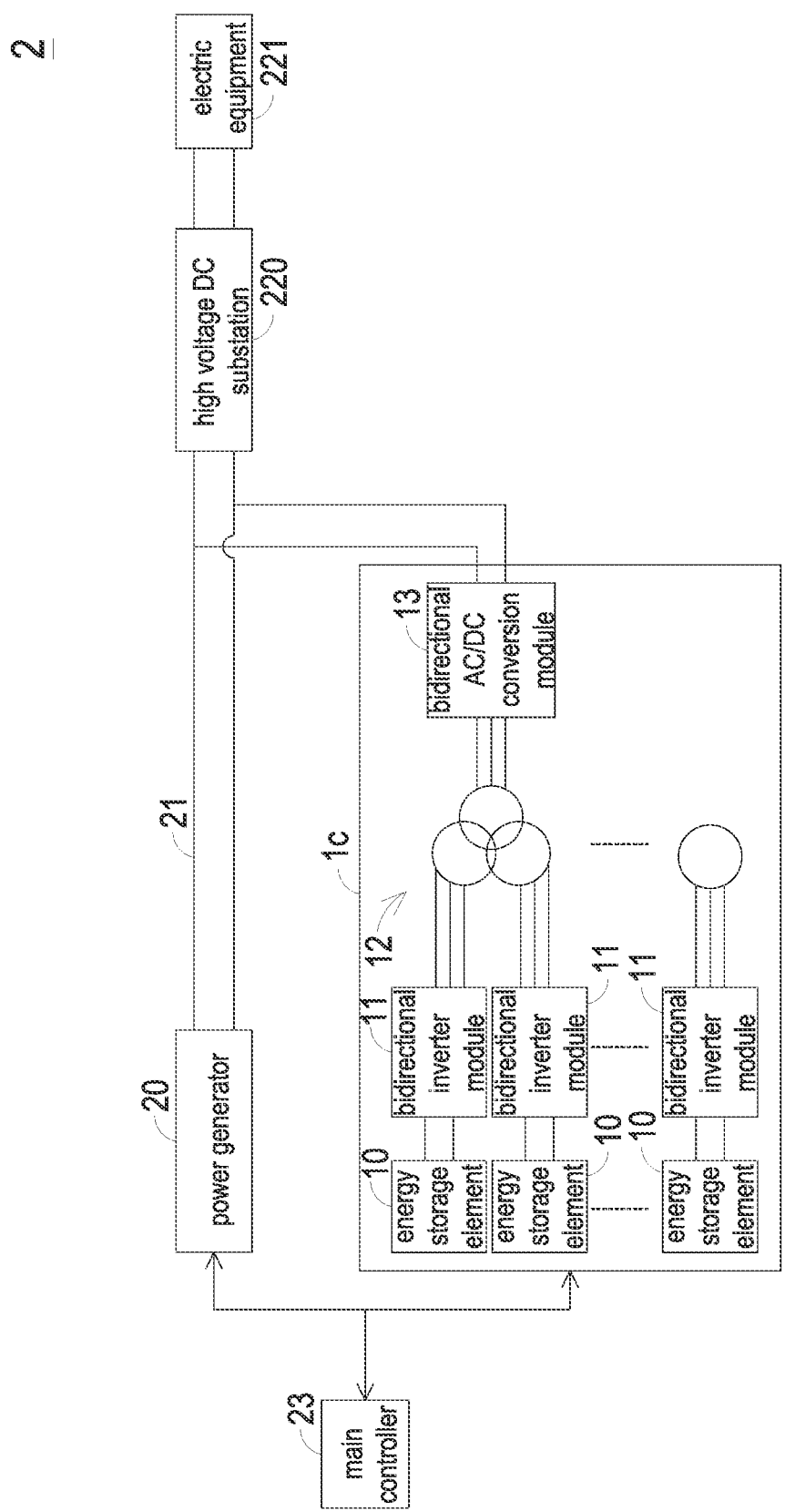
FIG. 3C is a schematic circuit diagram illustrating an energy storage device for a power system according to a fourth embodiment of the present disclosure.

FIG. 3C is a schematic circuit diagram illustrating an energy storage device for a power system according to a fourth embodiment of the present disclosure. As shown in FIG. 3C, the energy storage device 1*c* includes a plurality of energy storage elements 10, a plurality of bidirectional inverter modules 11, a medium frequency transformer 12 and a bidirectional AC/DC conversion module 13. In comparison with the embodiment of FIG. 3A, the energy storage device 1*b* of this embodiment includes a single medium frequency transformer 12, and the first transmission terminal of the medium frequency transformer 12 includes a plurality of windings. Each winding is electrically connected with the AC terminal of the corresponding bidirectional inverter module 11. The second transmission terminal of the medium frequency transformer 12 is electrically connected with the AC terminal of the bidirectional AC/DC conversion module 13. Preferably, the bidirectional AC/DC conversion module 13 of this embodiment further includes a multilevel converter such as a modular multilevel converter (MMC).

Figure 4:
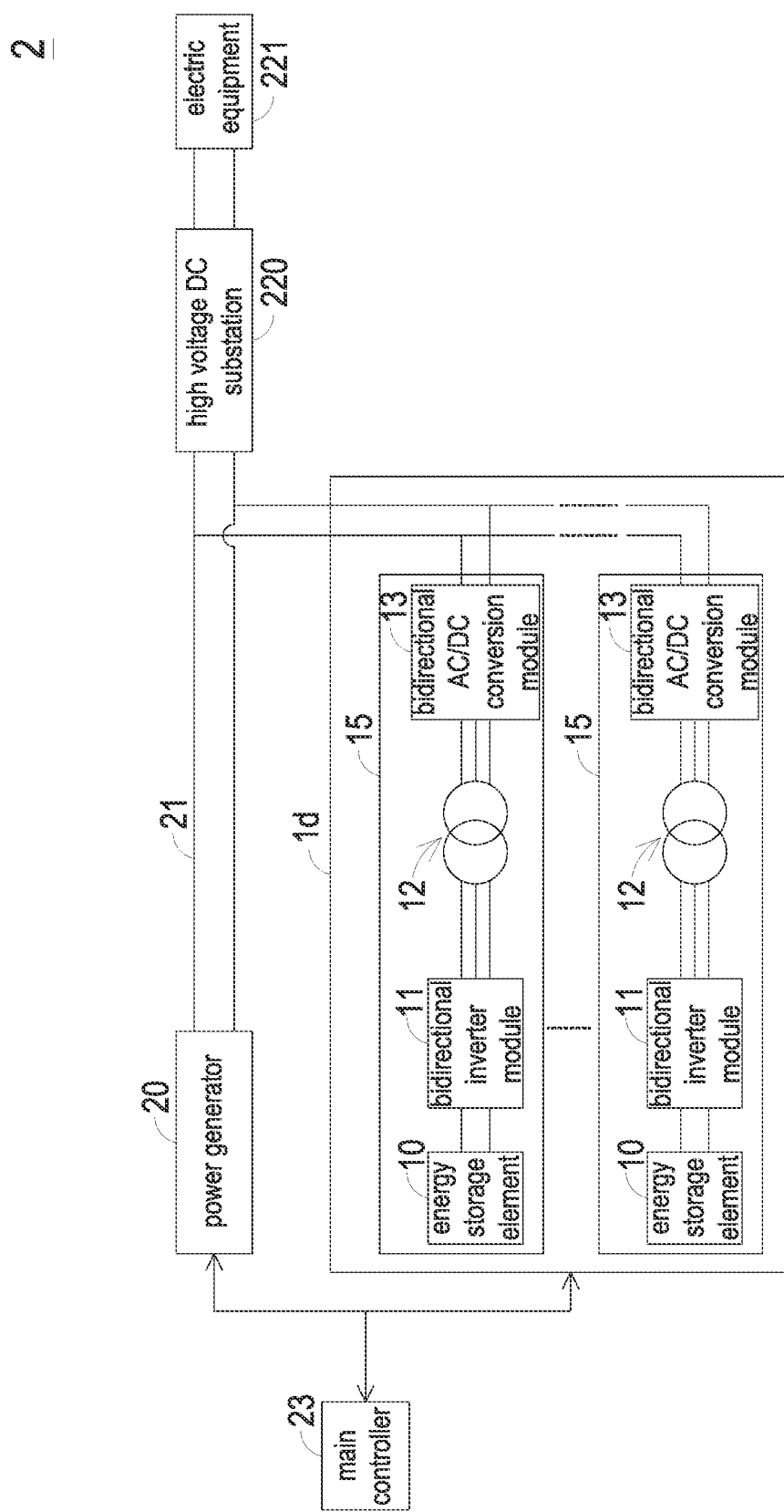
FIG. 4 is a schematic circuit diagram illustrating an energy storage device for a power system according to a fifth embodiment of the present disclosure.

FIG. 4 is a schematic circuit diagram illustrating an energy storage device for a power system according to a fifth embodiment of the present disclosure. As shown in FIG. 4, the energy storage device 1d includes a plurality of energy storage elements 10, a plurality of bidirectional inverter modules 11, a plurality of medium frequency transformers 12 and a plurality of bidirectional AC/DC conversion modules 13. Each energy storage element 10, the corresponding bidirectional inverter module 11, the corresponding medium frequency transformer 12 and the corresponding bidirectional AC/DC conversion module 13 are collaboratively formed as an energy storage unit 15. The DC terminals of the bidirectional AC/DC conversion modules 13 of the plurality of energy storage units 15 are connected with the high voltage DC transmission grid 21 in parallel. In this embodiment, the plurality of energy storage units 15 are independent from each other. In other words, each energy storage unit 15 can be linked to or ejected from the energy storage device 1d.

Figure 5A:
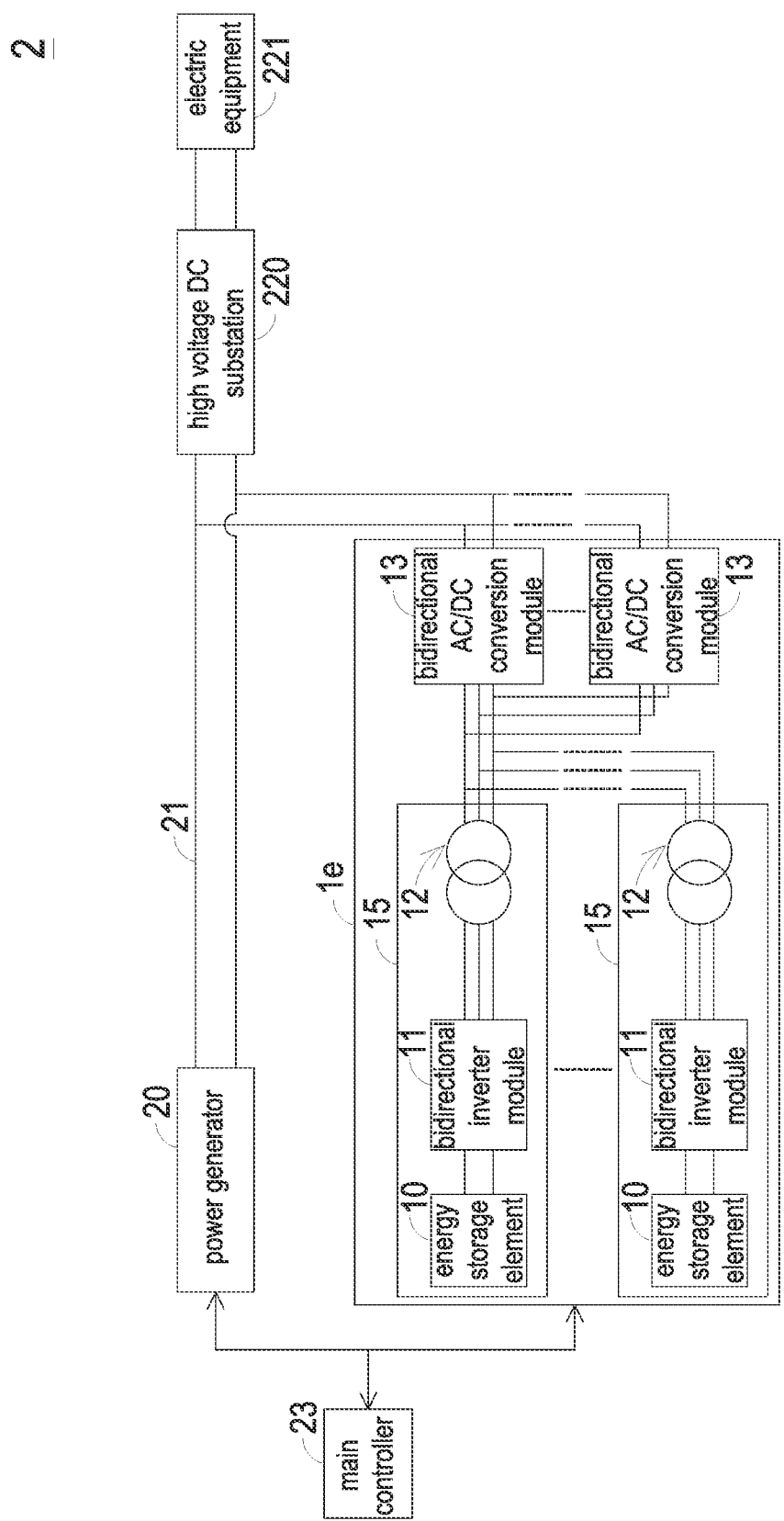
FIG. 5A is a schematic circuit diagram illustrating an energy storage device for a power system according to a sixth embodiment of the present disclosure.

FIG. 5A is a schematic circuit diagram illustrating an energy storage device for a power system according to a sixth embodiment of the present disclosure. As shown in FIG. 5A, the energy storage device 1e includes a plurality of energy storage elements 10, a plurality of bidirectional inverter modules 11, a plurality of medium frequency transformers 12 and a plurality of bidirectional AC/DC conversion modules 13. Each energy storage element 10, the corresponding bidirectional inverter module 11 and the corresponding medium frequency transformer 12 are collaboratively formed as an energy storage unit 15. The second transmission terminals of the medium frequency transformers 12 of the plurality of energy storage units 15 are electrically connected with each other in parallel and connected to a first AC port. The AC terminals of the plurality of bidirectional AC/DC conversion modules 13 are electrically connected with each other in parallel and connected to a second AC port. The first AC port is electrically connected with the second AC port. The DC terminals of the plurality of bidirectional AC/DC conversion modules 13 are connected with the high voltage DC transmission grid 21. In this embodiment, the plurality of bidirectional AC/DC conversion modules 13 are independent from each other. In case that one of the plurality of bidirectional AC/DC conversion modules 13 has a breakdown, the other bidirectional AC/DC conversion modules 13 can be operated normally. Consequently, the redundancy effect of energy storage device 1e is enhanced.

In a variant example of FIG. 5A, one of the plurality of bidirectional AC/DC conversion modules 13 is a master bidirectional AC/DC conversion module, and the other bidirectional AC/DC conversion modules 13 are slave bidirectional AC/DC conversion modules. The master bidirectional AC/DC conversion module 13 provides a control command to the slave bidirectional AC/DC conversion modules 13. For example, when the energy storage device 1e is operated in the grid-connected mode, the master bidirectional AC/DC conversion module 13 controls the AC voltage of the second AC port to generate a current command and equally distributes the current command to the slave bidirectional AC/DC conversion modules 13. Whereas, when the energy storage device 1e is operated in the off-grid mode, the master bidirectional AC/DC conversion module 13 controls the voltage of the high voltage DC transmission grid 21 to generate the current command and equally distributes the current command to the slave bidirectional AC/DC conversion modules 13.

Figure 5B:
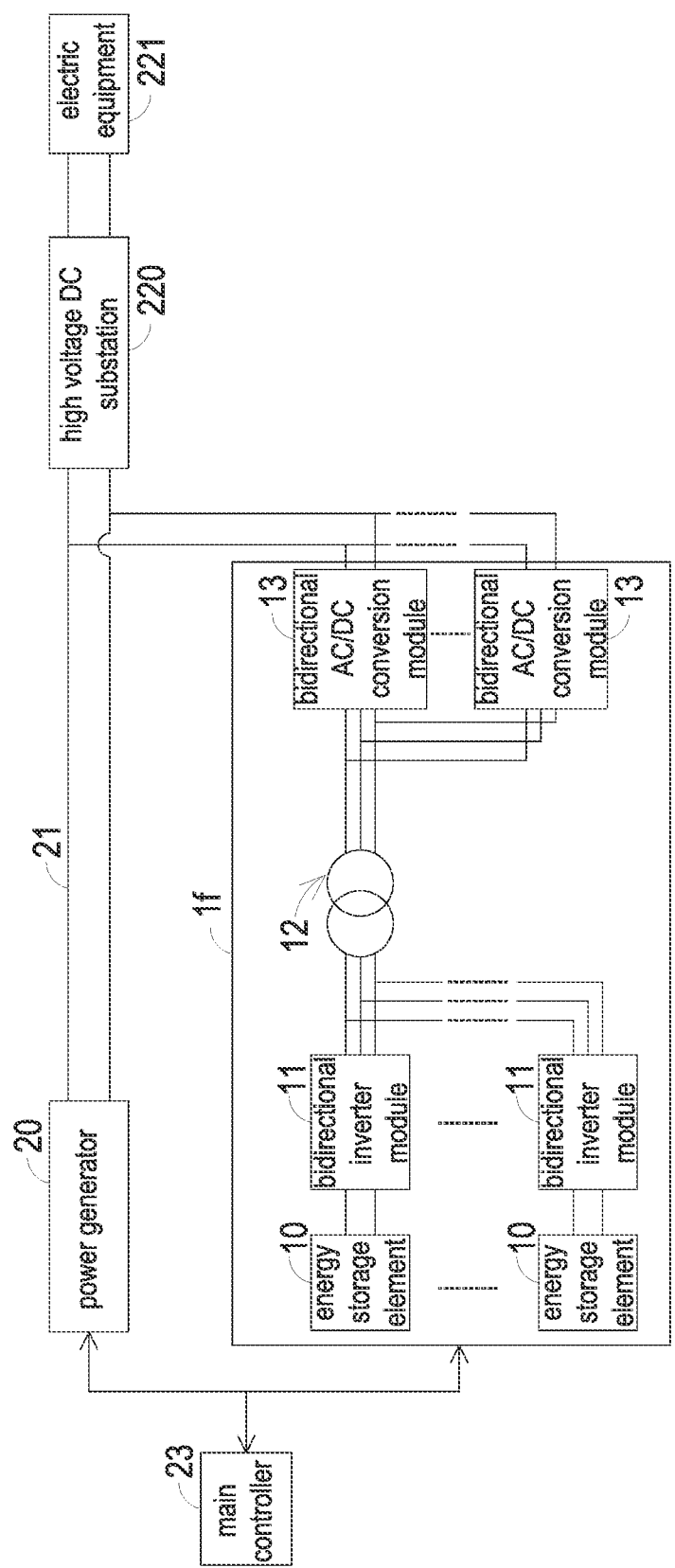
FIG. 5B is a schematic circuit diagram illustrating an energy storage device for a power system according to a seventh embodiment of the present disclosure.

FIG. 5B is a schematic circuit diagram illustrating an energy storage device for a power system according to a seventh embodiment of the present disclosure. As shown in FIG. 5B, the energy storage device 1f includes a plurality of energy storage elements 10, a plurality of bidirectional inverter modules 11, a medium frequency transformer 12 and a plurality of bidirectional AC/DC conversion modules 13. In comparison with the embodiment of FIG. 5A, the energy storage device if of this embodiment includes a single medium frequency transformer 12. Moreover, the AC terminals of the plurality of bidirectional inverter modules 11 are electrically connected with the first transmission terminal of the medium frequency transformer 12 in parallel. The second transmission terminal of the medium frequency transformer 12 is electrically connected with the second AC port. Preferably, the bidirectional AC/DC conversion module 13 of this embodiment further includes a multilevel converter such as a modular multilevel converter (MMC).

Figure 5C:
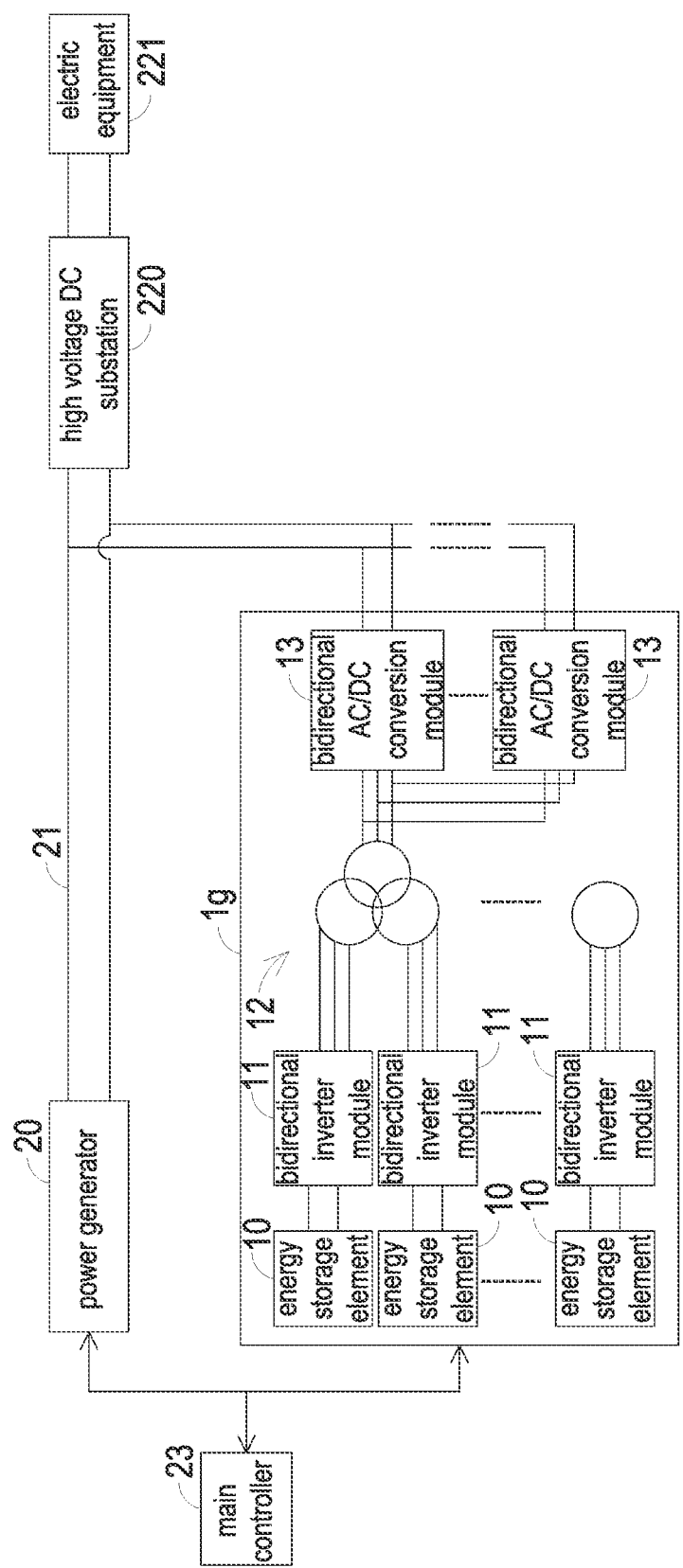
FIG. 5C is a schematic circuit diagram illustrating an energy storage device for a power system according to an eighth embodiment of the present disclosure.

FIG. 5C is a schematic circuit diagram illustrating an energy storage device for a power system according to an eighth embodiment of the present disclosure. As shown in FIG. 5C, the energy storage device 1g includes a plurality of energy storage elements 10, a plurality of bidirectional inverter modules 11, a medium frequency transformer 12 and a plurality of bidirectional AC/DC conversion modules 13. In comparison with the embodiment of FIG. 5A, the energy storage device 1g of this embodiment includes a single medium frequency transformer 12, and the first transmission terminal of the medium frequency transformer 12 includes a plurality of windings. Each winding is electrically connected with the AC terminal of the corresponding bidirectional inverter module 11. The second transmission terminal of the medium frequency transformer 12 is electrically connected with second AC port. Preferably, the bidirectional AC/DC conversion module 13 of this embodiment further includes a multilevel converter such as a modular multilevel converter (MMC).

The operations and the control configurations of the first controller 131 and the second controller 111 in the grid-connected mode and the off-grid mode will be described as follows.

Figure 6:
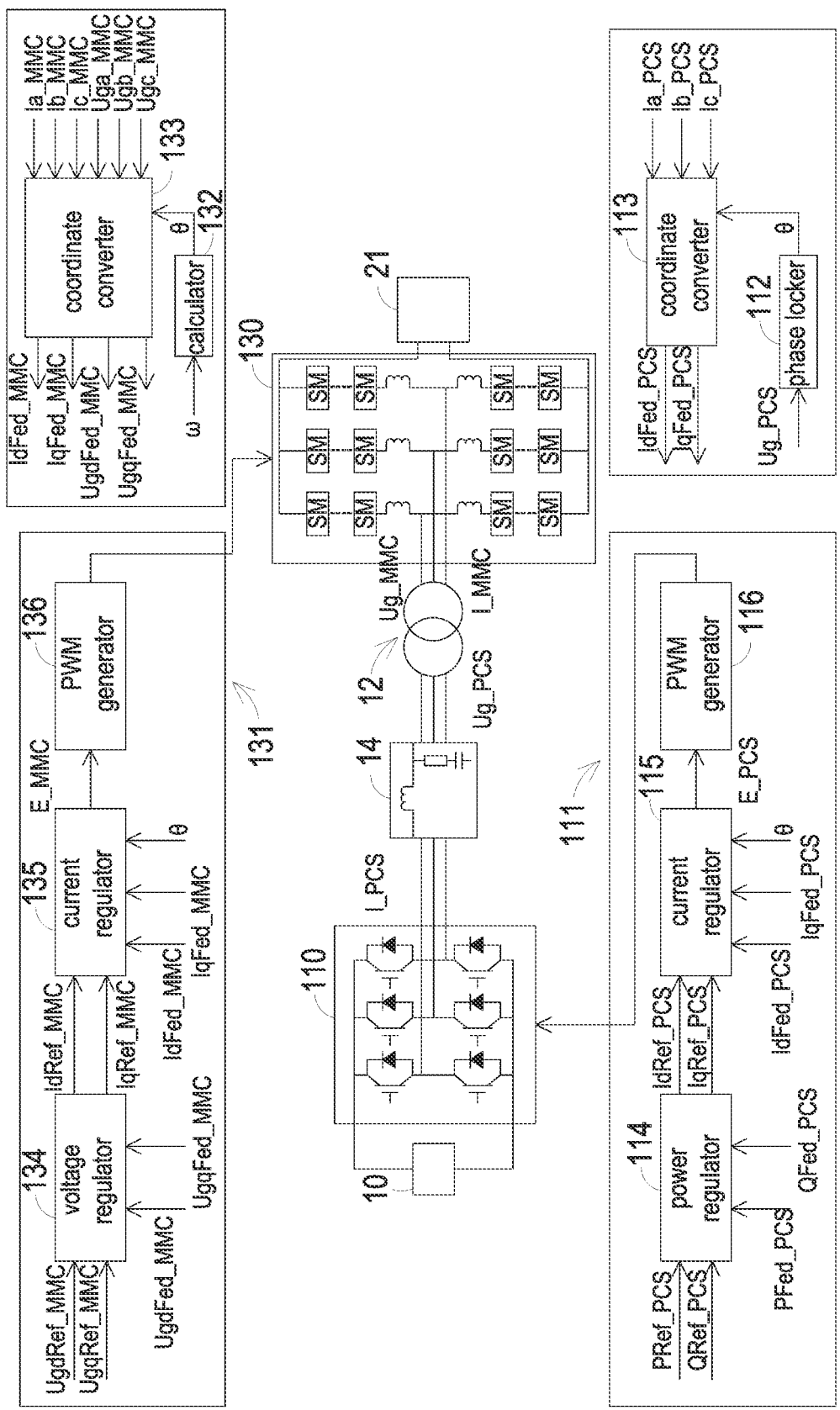
FIG. 6 is a schematic diagram illustrating the control configurations of the first controller and the second controller when the energy storage device as shown in FIG. 2 is in the grid-connected mode.
Figure 7:
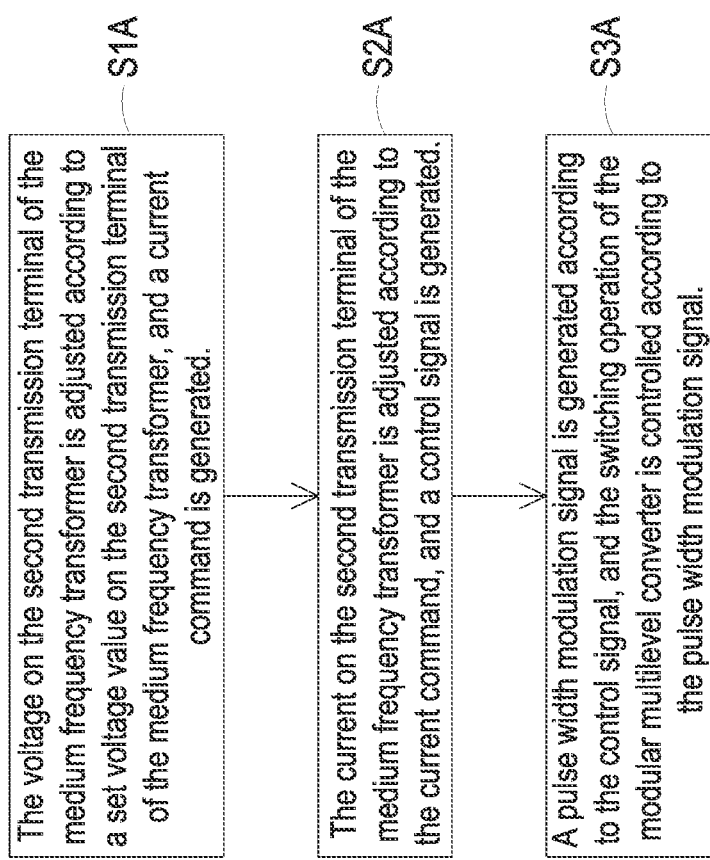
FIG. 7 is a flowchart illustrating a control method of the first controller when the energy storage device as shown in FIG. 6 is in the grid-connected mode.
Figure 8:
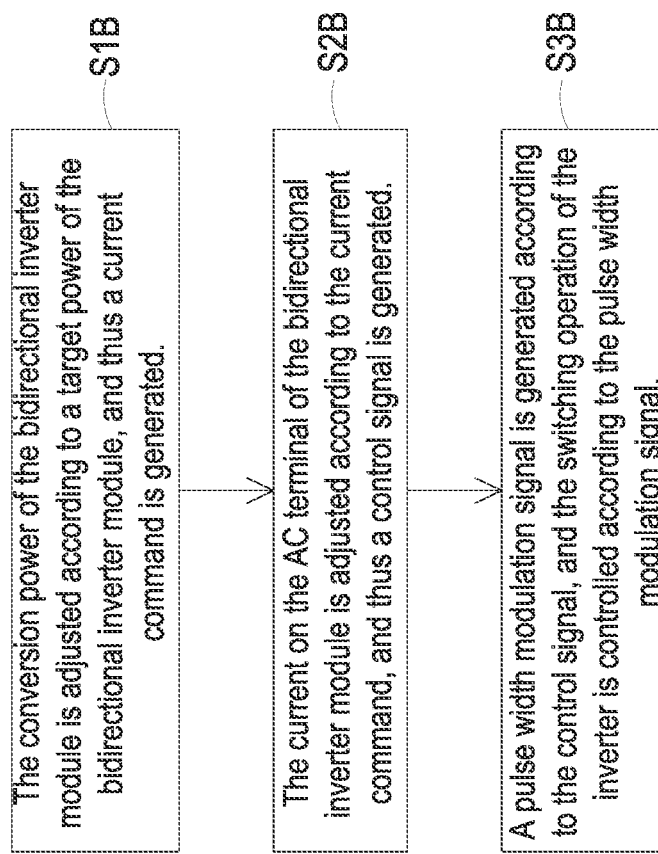
FIG. 8 is a flowchart illustrating a control method of the second controller when the energy storage device as shown in FIG. 6 is in the grid-connected mode.

FIG. 6 is a schematic diagram illustrating the control configurations of the first controller and the second controller when the energy storage device as shown in FIG. 2 is in the grid-connected mode. FIG. 7 is a flowchart illustrating a control method of the first controller when the energy storage device as shown in FIG. 6 is in the grid-connected mode. FIG. 8 is a flowchart illustrating a control method of the second controller when the energy storage device as shown in FIG. 6 is in the grid-connected mode. When the energy storage device 1 is operated in the grid-connected mode, the first controller 131 controls the switching operation of the modular multilevel converter 130 to adjust the voltage on the second transmission terminal of the medium frequency transformer 12 to a medium frequency high AC voltage. The frequency of the medium frequency high AC voltage is equal to the working frequency of the medium frequency transformer 12 (e.g., 400 Hz).

Please refer to FIG. 7. When the energy storage device 1 is in the grid-connected mode, the control method implemented by the first controller 131 includes the following steps. Firstly, in a step S1A, the voltage on the second transmission terminal of the medium frequency transformer 12 is adjusted according to a set voltage value on the second transmission terminal of the medium frequency transformer 12, and a current command is generated. In a step S2A, a current on the second transmission terminal of the medium frequency transformer 12 is adjusted according to the current command, and a control signal is generated. In a step S3A, a pulse width modulation signal is generated according to the control signal, and the switching operation of the modular multilevel converter 130 is controlled according to the pulse width modulation signal.

For implementing the control method of FIG. 7, the control configuration of the first controller 131 includes a calculator 132, a coordinate converter 133, a voltage regulator 134, a current regulator 135, and a pulse width modulation (PWM) generator 136. The calculator 132 generates an angle signal $\theta$ according to the operating angular frequency $\omega$ of the medium frequency transformer 12. That is, the calculator 132 integrates the operating angular frequency $\omega$ to generate the angle signal $\theta$. The operating angular frequency $\omega$ of the medium frequency transformer 12 can be set by the designer. The coordinate converter 133 generates a d-axis voltage feedback value UgdFed_MMC, a q-axis voltage feedback value UgqFed_MMC, a d-axis current feedback value IdFed_MMC and a q-axis current feedback value IqFed_MMC according to the three-phase current values I_MMC and the three-phase voltages Ug_MMC on the AC terminal of the modular multilevel converter 130 and the angle signal $\theta$. The voltage regulator 134 generates a d-axis current command IdRef_MMC and a q-axis current command IqRef_MMC according to the d-axis voltage feedback value UgdFed_MMC, the q-axis voltage feedback value UgdFed_MMC, a d-axis voltage command value UgdRef_MMC and a q-axis voltage command UgqRef_MMC. The d-axis voltage command value UgdRef_MMC is a fixed value (e.g., 18 kV or 36 kV), and the q-axis voltage command UgqRef_MMC is 0. The current regulator 135 generates a three-phase control potential E_MMC according to the d-axis current command IdRef_MMC, the q-axis current command IqRef_MMC, the d-axis current feedback value IdFed_MMC, the q-axis current feedback value IqFed_MMC and the angle signal $\theta$. The PWM generator 136 generates a pulse width modulation signal according to the three-phase control potential E_MMC in order to control the switching operation of the modular multilevel converter 130. Preferably but not exclusively, the PWM generator 136 generates the pulse width modulation signal through a sinusoidal PWM (SPWM) technology or a space vector PWM (SVPWM) technology.

When the energy storage device 1 is operated in the grid-connected mode, the second controller 111 controls the switching operation of the inverter 110 to adjust the conversion power of the bidirectional inverter module 11.

Please refer to FIG. 8. When the energy storage device 1 is in the grid-connected mode, the control method implemented by the second controller 111 includes the following steps. Firstly, in a step S1B, the conversion power of the bidirectional inverter module 11 is adjusted according to a target power of the bidirectional inverter module 11, and thus a current command is generated. Then, in a step S2B, the current on the AC terminal of the bidirectional inverter module 11 is adjusted according to the current command, and thus a control signal is generated. In a step S3B, a pulse width modulation signal is generated according to the control signal, and the switching operation of the inverter 110 is controlled according to the pulse width modulation signal.

For implementing the control method of FIG. 8, the control configuration of the second controller 111 includes a phase locker 112, a coordinate converter 113, a power regulator 114, a current regulator 115 and a PWM generator 116. The phase locker 112 generates an angle signal $\theta$ according to the voltage Ug_PCS on the first transmission terminal of the medium frequency transformer 12. That is, the phase locker 112 locks the voltage Ug_PCS on the second transmission terminal of the medium frequency transformer 12 to generate the angle signal $\theta$. The coordinate converter 113 generates a d-axis current feedback value IdFed_PCS and a q-axis current feedback value IqFed_PCS according to the three-phase current values I_PCS of the AC terminal of the inverter 110 and the angle signal $\theta$. The power regulator 114 generates a d-axis current command IdRef_PCS and a q-axis current command IqRef_PCS according to an active power command PRef_PCS, a reactive power command QRef_PCS, an active power feedback value PFed_PCS and a reactive power feedback value QFed_PCS. The active power command PRef_PCS is provided by the main controller 23. The reactive power command QRef_PCS is zero. The active power feedback value PFed_PCS and the reactive power feedback value QFed_PCS are calculated from the voltage Ug_PCS on the AC terminal of the bidirectional inverter module 12 and the three-phase current values I_PCS. The current regulator 115 generates a three-phase control potential E_PCS according to the d-axis current command IdRef_PCS, the q-axis current command IqRef_PCS, the d-axis current feedback value IdFed_PCS, the q-axis current feedback value IqFed_PCS and the angle signal $\theta$. The PWM generator 116 generates a pulse width modulation signal according to the three-phase control potential E_PCS. The switching operation of the inverter 110 is controlled according to the pulse width modulation signal. Preferably but not exclusively, the PWM generator 116 generates the pulse width modulation signal through a sinusoidal PWM (SPWM) technology or a space vector PWM (SVPWM) technology.

In an embodiment, the main controller 23 receives the state-of-charge (SOC) of the plurality of energy storage elements 10 and generates a power command of the bidirectional inverter module 12 according to the upper-level control command and the state of charge. Consequently, the conversion power of the bidirectional inverter module 11 can be adjusted according to the practical requirements.

Figure 9:
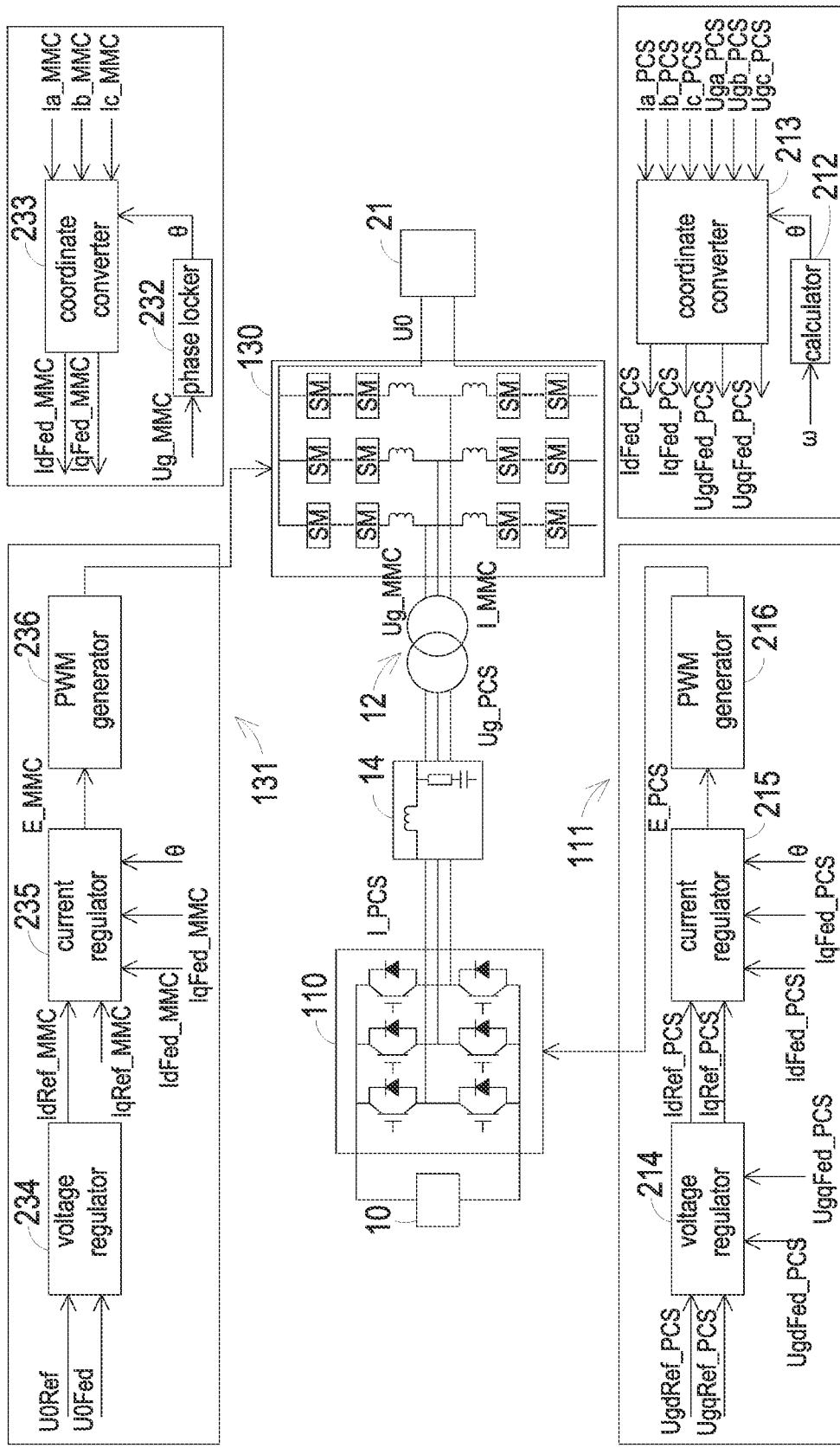
FIG. 9 is a schematic diagram illustrating the control configurations of the first controller and the second controller when the energy storage device as shown in FIG. 2 is in the off-grid mode.
Figure 10:
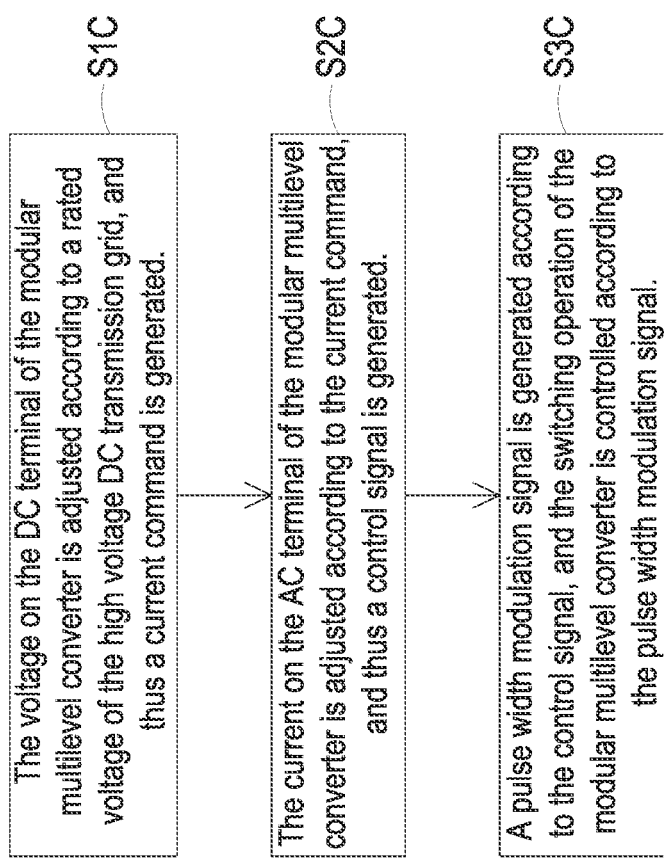
FIG. 10 is a flowchart illustrating a control method of the first controller when the energy storage device as shown in FIG. 9 is in the off-grid mode.
Figure 11:
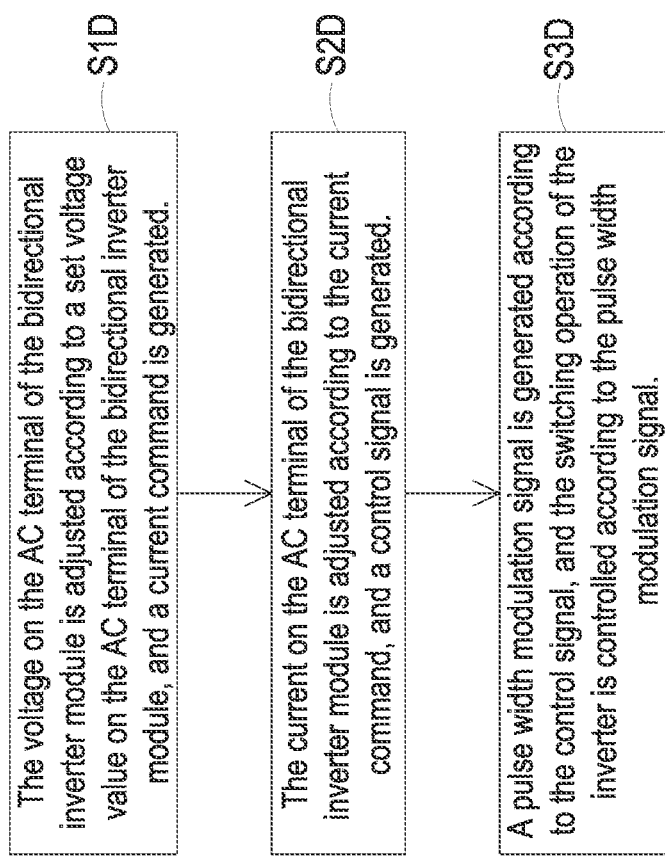
FIG. 11 is a flowchart illustrating a control method of the second controller when the energy storage device as shown in FIG. 9 is in the off-grid mode.

FIG. 9 is a schematic diagram illustrating the control configurations of the first controller and the second controller when the energy storage device as shown in FIG. 2 is in the off-grid mode. FIG. 10 is a flowchart illustrating a control method of the first controller when the energy storage device as shown in FIG. 9 is in the off-grid mode. FIG. 11 is a flowchart illustrating a control method of the second controller when the energy storage device as shown in FIG. 9 is in the off-grid mode.

Please refer to FIGS. 2, 9, 10 and 11. When the energy storage device 1 is operated in the off-grid mode, the first controller 131 controls the switching operation of the modular multilevel converter 130. Consequently, the voltage on the DC terminal of the modular multilevel converter 130 is adjusted to be equal to the rated voltage of the high voltage DC transmission grid 21.

Please refer to FIG. 10. When the energy storage device 1 is in the off-grid mode, the control method implemented by the first controller 131 includes the following steps. Firstly, in a step S1C, the voltage on the DC terminal of the modular multilevel converter 130 is adjusted according to a rated voltage of the high voltage DC transmission grid 21, and thus a current command is generated. In a step S2C, the current on the AC terminal of the modular multilevel converter 130 is adjusted according to the current command, and thus a control signal is generated. In a step S3C, a pulse width modulation signal is generated according to the control signal, and the switching operation of the modular multilevel converter 130 is controlled according to the pulse width modulation signal.

For implementing the control method of FIG. 10, the control configuration of the first controller 131 includes a phase locker 232, a coordinate converter 233, a voltage regulator 234, a current regulator 235 and a PWM generator 236. The phase locker 232 generates an angle signal $\theta$ according to the voltage Ug_MMC on the first transmission terminal of the medium frequency transformer 12. That is, the phase locker 232 locks the voltage Ug_MMC on the second transmission terminal of the medium frequency transformer 12 to generate the angle signal $\theta$. The coordinate converter 233 generates a d-axis current feedback value IdFed_MMC and a q-axis current feedback value IqFed_MMC according to the three-phase current values I_MMC of the AC port of the modular multilevel converter 130 and the angle signal $\theta$. The voltage regulator 234 generates a d-axis current command IdRef_MMC according to a high-voltage DC side voltage command U0Ref and a high-voltage DC side voltage feedback value U0Fed. The q-axis current command IqRef_MMC is zero. The high-voltage DC side voltage command U0Ref is the rated voltage amplitude of the high voltage DC transmission grid 21. In addition, the high-voltage DC side voltage feedback value U0Fed is obtained by sampling the voltage U0 on the high voltage DC transmission grid 21. The current regulator 235 generates a three-phase control potential E_MMC according to a d-axis current command IdRef_MMC, a q-axis current command IqRef_MMC, the d-axis current feedback value IdFed_MMC, the q-axis current feedback value IqFed_MMC and the angle signal $\theta$. The PWM generator 236 generates a pulse width modulation signal according to the three-phase control potential E_MMC, and the switching operation of the modular multilevel converter 130 is controlled according to the pulse width modulation signal. Preferably but not exclusively, the PWM generator 236 generates the pulse width modulation signal through a sinusoidal PWM (SPWM) technology or a space vector PWM (SVPWM) technology.

When the energy storage device 1 is operated in the off-grid mode, the second controller 111 controls the switching operation of the inverter 110 to adjust the voltage on the AC terminal of the bidirectional inverter module 11. Consequently, the frequency of the voltage on the AC terminal of the bidirectional inverter module 11 is equal to the working frequency of the medium frequency transformer 12.

Please refer to FIG. 11. When the energy storage device 1 is in the off-grid mode, the control method implemented by the second controller 111 includes the following steps. Firstly, in a step S1D, the voltage on the AC terminal of the bidirectional inverter module 11 is adjusted according to a set voltage value on the AC terminal of the bidirectional inverter module 11, and a current command is generated. In a step S2D, a current on the AC terminal of the bidirectional inverter module 11 is adjusted according to the current command, and a control signal is generated. In a step S3D, a pulse width modulation signal is generated according to the control signal, and the switching operation of the inverter 110 is controlled according to the pulse width modulation signal.

For implementing the control method of FIG. 11, the control configuration of the second controller 111 includes a calculator 212, a coordinate converter 213, a voltage regulator 214, a current regulator 215 and a pulse width modulation (PWM) generator 216. The calculator 212 generates an angle signal $\theta$ according to the operating angular frequency $\omega$ of the medium frequency transformer 12. That is, the calculator 212 integrates the operating angular frequency $\omega$ to generate the angle signal $\theta$. The coordinate converter 213 generates a d-axis voltage feedback value UgdFed_PCS, a q-axis voltage feedback value UgdFed_PCS, a d-axis current feedback value IdFed_PCS and a q-axis current feedback value IqFed_PCS according to the three-phase current values I_PCS and the three-phase voltages Ug_PCS on the AC terminal of the inverter 110 and the angle signal $\theta$. The voltage regulator 214 generates a d-axis current command IdRef_PCS and a q-axis current command IqRef_PCS according to the d-axis voltage feedback value UgdFed_PCS, the q-axis voltage feedback value UgqFed_PCS, a d-axis voltage command UgdRef_PCS and a q-axis voltage command UgqRef_PCS. Moreover, the d-axis voltage command UgdRef_PCS is the amplitude of the rated voltage on the first transmission terminal of the medium frequency transformer 12, and the q-axis voltage command UgqRef_PCS is 0. The current regulator 215 generates a three-phase control potential E_PCS according to the d-axis current command IdRef_PCS, the q-axis current command IqRef_PCS, the d-axis current feedback value IdFed_PCS, the q-axis current feedback value IqFed_PCS and the angle signal $\theta$. The PWM generator 216 generates a pulse width modulation signal according to the three-phase control potential E_PCS in order to control the switching operation of the inverter 110. Preferably but not exclusively, the PWM generator 216 generates the pulse width modulation signal through a sinusoidal PWM (SPWM) technology or a space vector PWM (SVPWM) technology.

Figure 12:
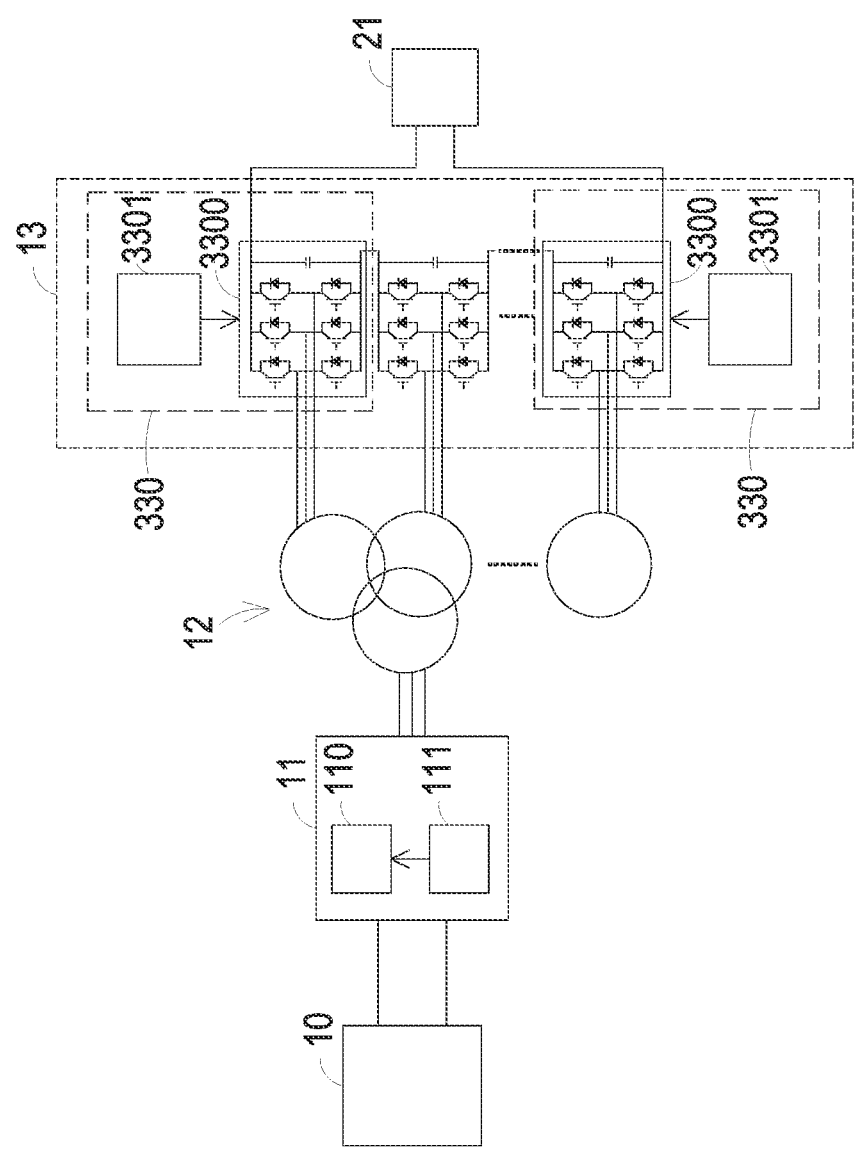
FIG. 12 is a schematic circuit diagram illustrating an energy storage device for a power system according to a ninth embodiment of the present disclosure.

Moreover, the bidirectional AC/DC conversion module 13 as shown in FIG. 1, FIG. 3A, FIG. 4 or FIG. 5A may include a multilevel converter (e.g., a modular multilevel converter, MMC) or a plurality of converters. An example of the bidirectional AC/DC conversion module 13 with the plurality of converters will be described with reference to FIG. 12. FIG. 12 is a schematic circuit diagram illustrating an energy storage device for a power system according to a ninth embodiment of the present disclosure. Component parts and elements corresponding to those of the first embodiment as shown in FIG. 2 are designated by identical numeral references, and detailed descriptions thereof are omitted. As shown in FIG. 12, the second transmission terminal of the medium frequency transformer 12 in the energy storage device 1h includes a plurality of windings. In addition, the bidirectional AC/DC conversion module 13 includes a plurality of converters 330, which are connected with each other in series. Each winding is electrically connected with the corresponding converter 330. Each converter 330 includes a switch circuit 3300 and a first controller 3301. The first controller 3301 is electrically connected with the corresponding switch circuit 3300.

The operations and the control configurations of the first controller 3301 and the second controller 111 in the grid-connected mode and the off-grid mode will be described as follows.

Figure 13:
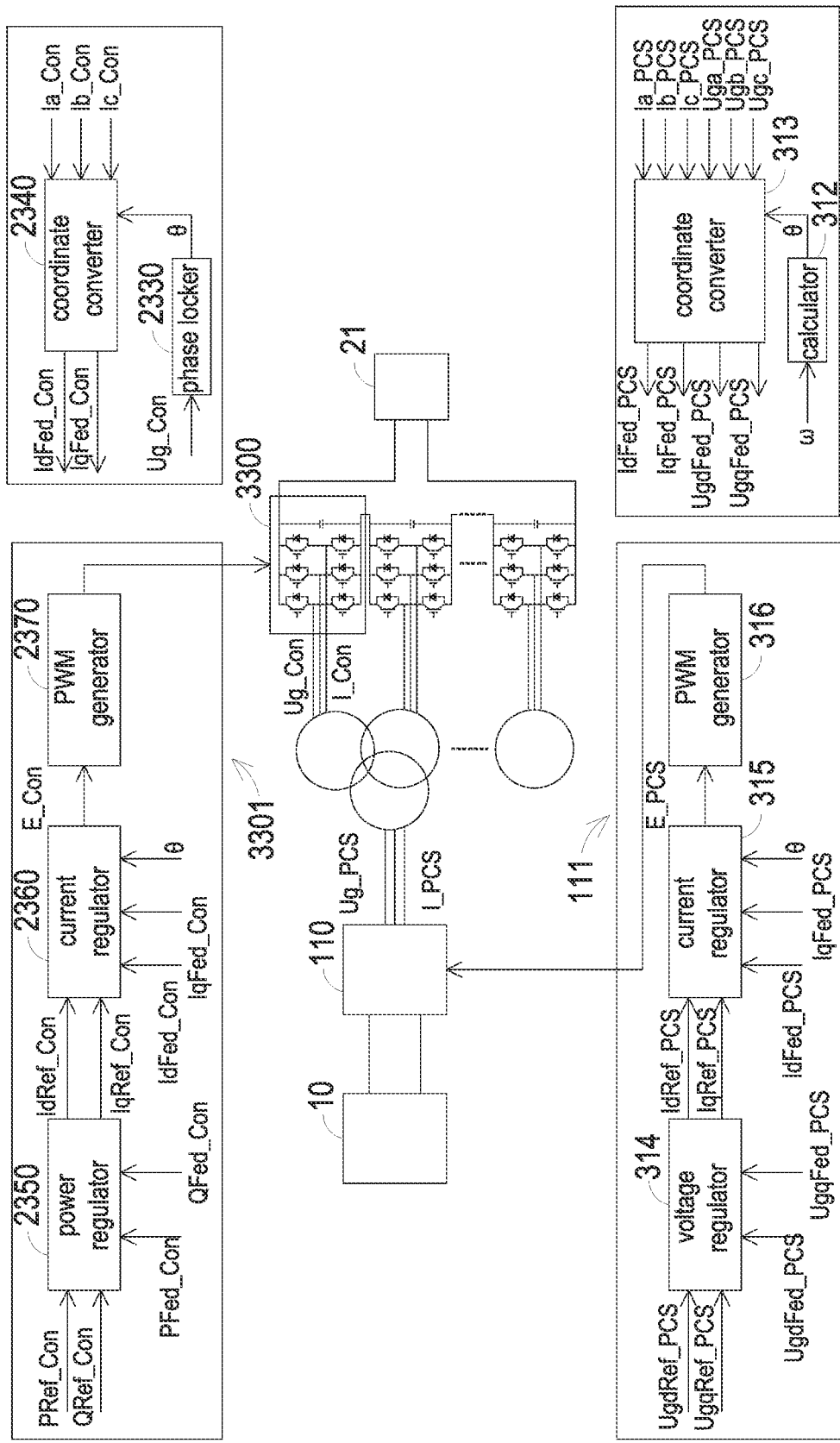
FIG. 13 is a schematic diagram illustrating the control configurations of the first controller and the second controller when the energy storage device as shown in FIG. 12 is in the grid-connected mode.
Figure 14:
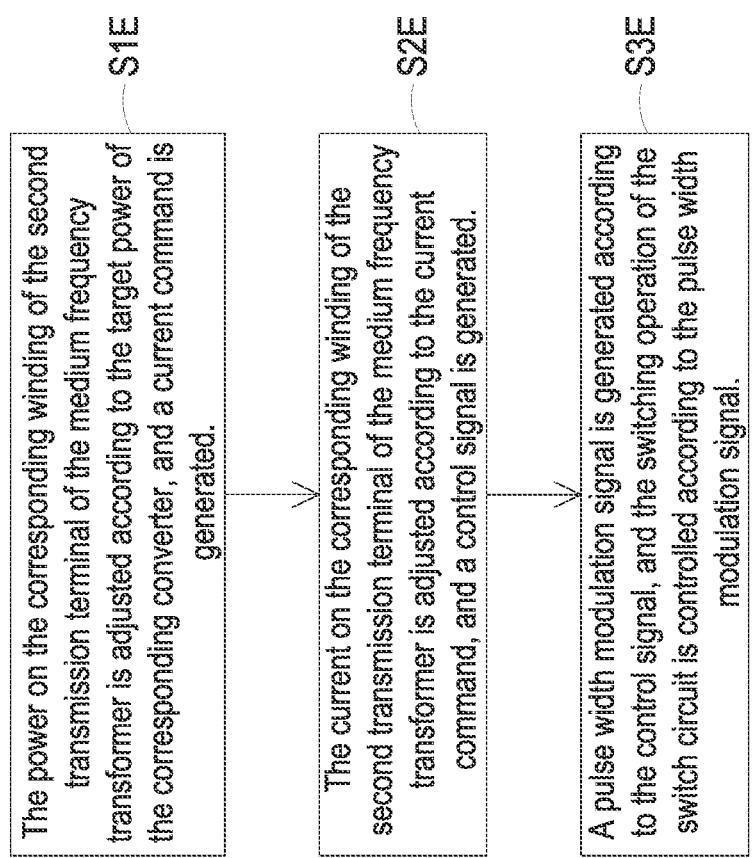
FIG. 14 is a flowchart illustrating a control method of the first controller when the energy storage device as shown in FIG. 13 is in the grid-connected mode.
Figure 15:
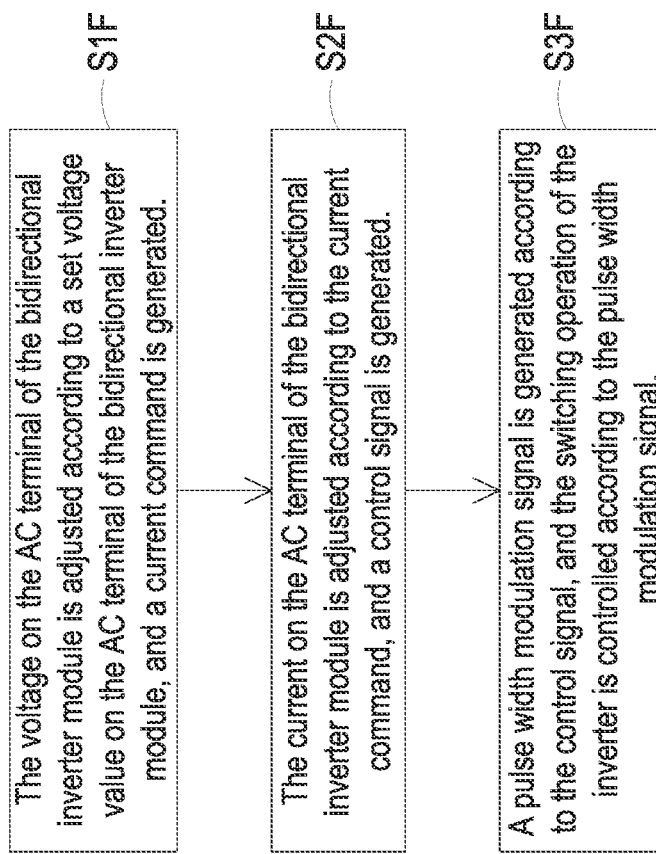
FIG. 15 is a flowchart illustrating a control method of the second controller when the energy storage device as shown in FIG. 13 is in the grid-connected mode or the off-grid mode.

FIG. 13 is a schematic diagram illustrating the control configurations of the first controller and the second controller when the energy storage device as shown in FIG. 12 is in the grid-connected mode. FIG. 14 is a flowchart illustrating a control method of the first controller when the energy storage device as shown in FIG. 13 is in the grid-connected mode. FIG. 15 is a flowchart illustrating a control method of the second controller when the energy storage device as shown in FIG. 13 is in the grid-connected mode or the off-grid mode. When the energy storage device 1h is operated in the grid-connected mode, each first controller 3301 controls the switching operation of the switch circuit 3300 to adjust the power on the corresponding winding of the second transmission terminal of the medium frequency transformer 12.

Please refer to FIG. 14. When the energy storage device 1h is in the grid-connected mode, the control method implemented by each first controller 3301 includes the following steps. Firstly, in a step S1E, the power on the corresponding winding of the second transmission terminal of the medium frequency transformer 12 is adjusted according to the target power of the corresponding converter 330, and a current command is generated. In a step S2E, a current on the corresponding winding of the second transmission terminal of the medium frequency transformer 12 is adjusted according to the current command, and a control signal is generated. In a step S3E, a pulse width modulation signal is generated according to the control signal, and the switching operation of the switch circuit 3300 is controlled according to the pulse width modulation signal.

For implementing the control method of FIG. 14, the control configuration of the first controller 3301 includes a phase locker 2330, a coordinate converter 2340, a power regulator 2350, a current regulator 2360 and a PWM generator 2370. The phase locker 2330 generates an angle signal θ according to the voltage Ug_Con on the corresponding winding of the second transmission terminal of the medium frequency transformer 12. That is, the phase locker 112 locks the voltage Ug_Con on the corresponding winding of the second transmission terminal of the medium frequency transformer 12 to generate the angle signal θ. The coordinate converter 2340 generates a d-axis current feedback value IdFed_Con and a q-axis current feedback value IqFed_Con according to the three-phase current values Ii_Con of the AC terminal of the corresponding switch circuit 3300 and the angle signal θ, i=a, b, c. The power regulator 2350 generates a d-axis current command IdRef_Con and a q-axis current command IqRef_Con according to an active power command PRef_Con, a reactive power command QRef_Con, an active power feedback value PFed_Con and a reactive power feedback value QFed_Con. The active power command PRef_Con is provided by the main controller 23. The reactive power command QRef_Con is zero. The active power feedback value PFed_Con and the reactive power feedback value QFed_Con are calculated from the voltage Ug_Con on the corresponding winding of the second transmission terminal of the medium frequency transformer 12 and the three-phase current values I_Con of the AC port of the corresponding switch circuit 3300. The current regulator 2360 generates a three-phase control potential E_Con according to the d-axis current command IdRef_Con, the q-axis current command IqRef_Con, the d-axis current feedback value IdFed_Con, the q-axis current feedback value IqFed_Con and the angle signal θ. The PWM generator 2370 generates a pulse width modulation signal according to the three-phase control potential E_Con. The switching operation of the corresponding switch circuit 3300 is controlled according to the pulse width modulation signal. Preferably but not exclusively, the PWM generator 2370 generates the pulse width modulation signal through a sinusoidal PWM (SPWM) technology or a space vector PWM (SVPWM) technology.

When the energy storage device 1 is operated in the grid-connected mode, the second controller 111 controls the switching operation of the inverter 110 to adjust the voltage on the AC terminal of the bidirectional inverter module 11. Consequently, the frequency of the voltage on the AC terminal of the bidirectional inverter module 11 is equal to the working frequency of the medium frequency transformer 12.

Please refer to FIG. 15. When the energy storage device 1h is in the grid-connected mode, the control method implemented by the second controller 111 includes the following steps. Firstly, in a step S1F, the voltage on the AC terminal of the bidirectional inverter module 11 is adjusted according to a set voltage value on the AC terminal of the bidirectional inverter module 11, and a current command is generated. In a step S2F, a current on the AC terminal of the bidirectional inverter module 11 is adjusted according to the current command, and a control signal is generated. In a step S3F, a pulse width modulation signal is generated according to the control signal, and the switching operation of the inverter 110 is controlled according to the pulse width modulation signal.

For implementing the control method of FIG. 15, the control configuration of the second controller 111 includes a calculator 312, a coordinate converter 313, a voltage regulator 314, a current regulator 315 and a pulse width modulation (PWM) generator 316. The calculator 312 generates an angle signal θ according to the operating angular frequency ω of the medium frequency transformer 12. That is, the calculator 312 integrates the operating angular frequency ω to generate the angle signal θ. The coordinate converter 313 generates a d-axis voltage feedback value UgdFed_PCS, a q-axis voltage feedback value UgqFed_PCS, a d-axis current feedback value IdFed_PCS and a q-axis current feedback value IqFed_PCS according to the three-phase current values I_PCS and the three-phase voltages Ug_PCS on the AC terminal of the inverter 110 and the angle signal θ. The voltage regulator 314 generates a d-axis current command IdRef_PCS and a q-axis current command IqRef_PCS according to the d-axis voltage feedback value UgdFed_PCS, the q-axis voltage feedback value UgqFed_PCS, a d-axis voltage command UgdRef_PCS and a q-axis voltage command UgqRef_PCS. Moreover, the d-axis voltage command UgdRef_PCS is the amplitude of the rated voltage on the first transmission terminal of the medium frequency transformer 12, and the q-axis voltage command UgqRef_PCS is 0. The current regulator 315 generates a three-phase control potential E_PCS according to the d-axis current command IdRef_PCS, the q-axis current command IqRef_PCS, the d-axis current feedback value IdFed_PCS, the q-axis current feedback value IqFed_PCS and the angle signal θ. The PWM generator 316 generates a pulse width modulation signal according to the three-phase control potential E_PCS in order to control the switching operation of the inverter 110. Preferably but not exclusively, the PWM generator 316 generates the pulse width modulation signal through a sinusoidal PWM (SPWM) technology or a space vector PWM (SVPWM) technology.

Figure 16:
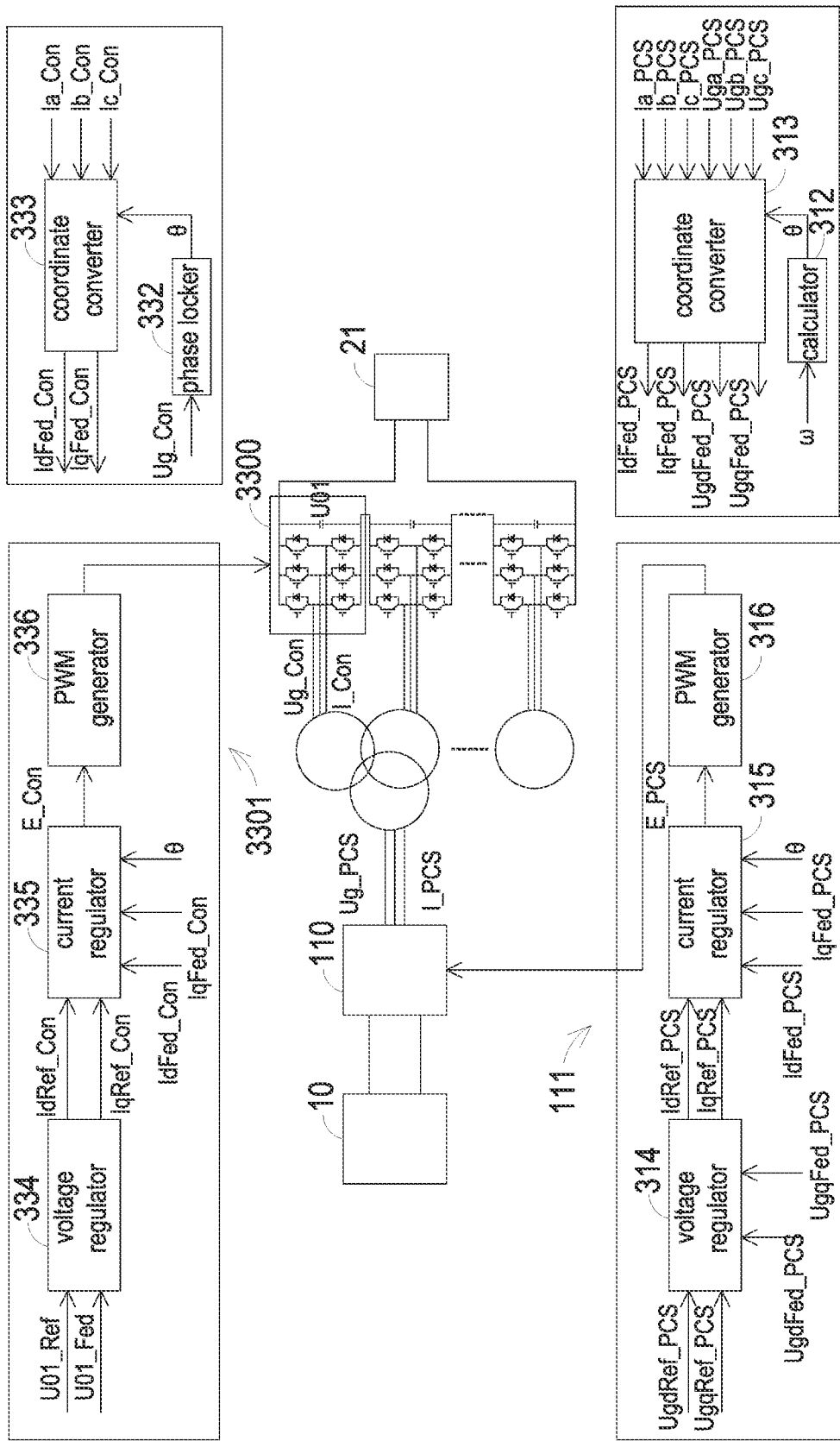
FIG. 16 is a schematic diagram illustrating the control configurations of the first controller and the second controller when the energy storage device as shown in FIG. 12 is in the off-grid mode.
Figure 17:
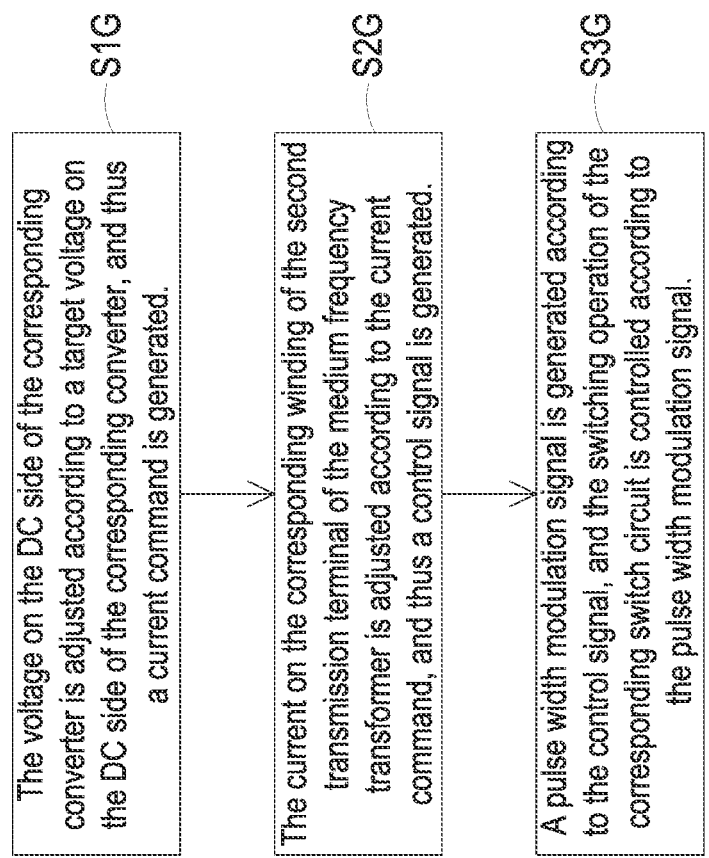
FIG. 17 is a flowchart illustrating a control method of the first controller when the energy storage device as shown in FIG. 16 is in the off-grid mode.

FIG. 16 is a schematic diagram illustrating the control configurations of the first controller and the second controller when the energy storage device as shown in FIG. 12 is in the off-grid mode. FIG. 17 is a flowchart illustrating a control method of the first controller when the energy storage device as shown in FIG. 16 is in the off-grid mode.

When the energy storage device 1h is operated in the off-grid mode, each first controller 3301 controls the switching operation of the corresponding switch circuit 3300. Consequently, the voltage U01 on a DC side of the corresponding converter 330 is adjusted.

Please refer to FIG. 17. When the energy storage device 1h is in the off-grid mode, the control method implemented by the first controller 3301 includes the following steps. Firstly, in a step S1G the voltage U01 on the DC side of the corresponding converter 330 is adjusted according to a target voltage on the DC side of the corresponding converter 330, and thus a current command is generated. In a step S2G the current on the corresponding winding of the second transmission terminal of the medium frequency transformer 12 is adjusted according to the current command, and thus a control signal is generated. In a step S3G, a pulse width modulation signal is generated according to the control signal, and the switching operation of the corresponding switch circuit 3300 is controlled according to the pulse width modulation signal.

For implementing the control method of FIG. 17, the control configuration of the first controller 3301 includes a phase locker 332, a coordinate converter 333, a voltage regulator 334, a current regulator 335 and a PWM generator 336. The phase locker 332 generates an angle signal θ according to the voltage Ug_Con on the corresponding winding of the second transmission terminal of the medium frequency transformer 12. That is, the phase locker 332 locks the voltage Ug_Con on the corresponding winding of the second transmission terminal of the medium frequency transformer 12 to generate the angle signal θ. The coordinate converter 333 generates a d-axis current feedback value IdFed_Con and a q-axis current feedback value IqFed_Con according to the three-phase current values I_Con of the AC terminal of the corresponding switch circuit 3300 and the angle signal θ. The voltage regulator 334 generates a d-axis current command IdRef_Con and a q-axis current command IqRef_Con according to a DC side voltage command U01Ref and a DC side voltage feedback value U01Fed. After the voltage amplitude of the high voltage DC transmission grid 21 is divided by the number of the converters 330, the DC side voltage command U01Ref is obtained. The DC side voltage feedback value U01Fed is obtained by sampling the DC side voltage U01 of the converter 330. The current regulator 335 generates a three-phase control potential E_Con according to the d-axis current command IdRef_Con, the q-axis current command IqRef_Con, the d-axis current feedback value IdFed_Con, the q-axis current feedback value IqFed_Con and the angle signal θ. The PWM generator 336 generates a pulse width modulation signal according to the three-phase control potential E_Con. The switching operation of the corresponding switch circuit 3300 is controlled according to the pulse width modulation signal. Preferably but not exclusively, the PWM generator 336 generates the pulse width modulation signal through a sinusoidal PWM (SPWM) technology or a space vector PWM (SVPWM) technology.

When the energy storage device 1h is operated in the off-grid mode, the second controller 111 controls the switching operation of the inverter 110 to adjust the voltage on the first transmission terminal of the medium frequency transformer 12. Consequently, the frequency of the voltage on the first transmission terminal of the medium frequency transformer 12 is equal to the working frequency of the medium frequency transformer 12. The working frequency of the medium frequency transformer 12 can be set by the designer. The operations and the control configurations of the second controller 111 in the off-grid mode are similar to those as shown in FIGS. 13 and 15, and not redundantly described herein.

Figure 18:
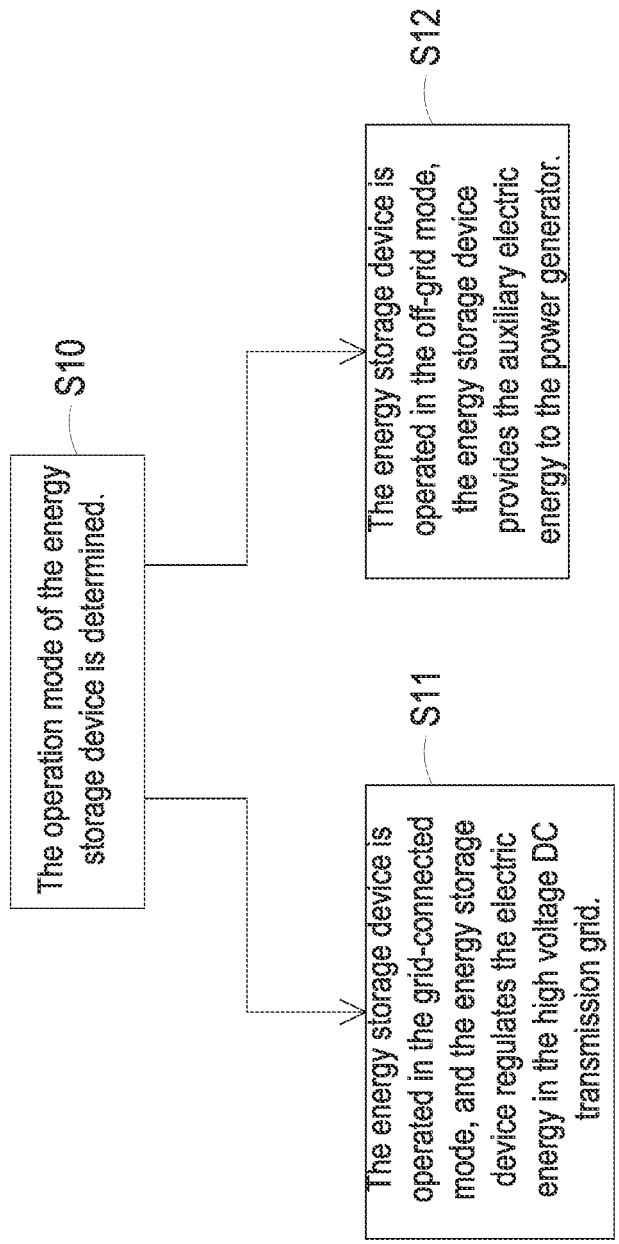
FIG. 18 is a flowchart illustrating a control method for a power system according to an embodiment of the present disclosure.

FIG. 18 is a flowchart illustrating a control method for a power system according to an embodiment of the present disclosure. The control method can be applied to the power system 2 as shown in FIG. 1, 3, 4 or 5. As shown in FIG. 18, the control method includes the following steps S10, S11 and S12.

In the step S10, the operation mode of the energy storage device 1 is determined. In the step S11, the energy storage device 1 is operated in the grid-connected mode, and the energy storage device 1 regulates the electric energy in the high voltage DC transmission grid 21. In the step S12, the energy storage device 1 is operated in the off-grid mode, the energy storage device 1 provides the auxiliary electric energy to the power generator 20.

Figure 19:
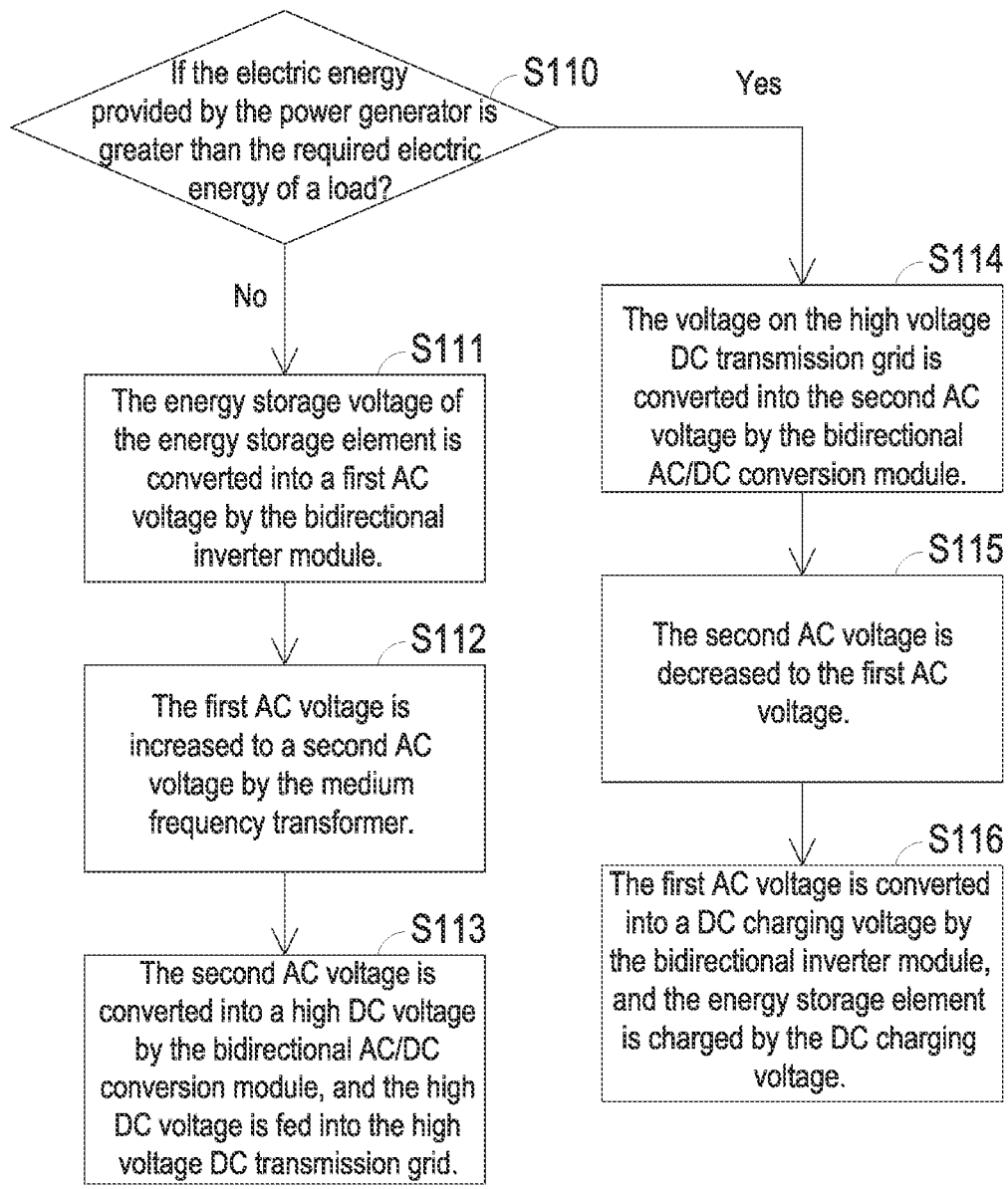
FIG. 19 is a flowchart illustrating the step S11 of the control method as shown in FIG. 18.

FIG. 19 is a flowchart illustrating the step S11 of the control method as shown in FIG. 18. The step S11 includes the following sub-steps. Firstly, a sub-step S110 is performed to determine whether the electric energy provided by the power generator 20 is greater than the required electric energy of a load. For example, the load includes the high voltage DC substation 220 and the power equipment 221. When the determining result of the sub-step S110 indicates that the electric energy provided by the power generator 20 is lower than the required electric energy of the load, a sub-step S111 is performed. In the sub-step S111, the energy storage voltage of the energy storage element 10 is converted into a first AC voltage by the bidirectional inverter module 11. For example, the first AC voltage has a second voltage level (e.g., 480V). Preferably, the first AC voltage is a three-phase voltage. After the sub-step S111, a sub-step S112 is performed. In the sub-step S112, the first AC voltage is increased to a second AC voltage by the medium frequency transformer 12. The second AC voltage has a first voltage level (e.g., 18 kV or 36 kV). Preferably, the second AC voltage is a three-phase voltage. After the sub-step S112, a sub-step S113 is performed. In the sub-step S113, the second AC voltage is converted into a high DC voltage by the bidirectional AC/DC conversion module 13, and the high DC voltage is fed into the high voltage DC transmission grid 21. Whereas, when the determining result of the sub-step S110 indicates that the electric energy provided by the power generator 20 is greater than the required electric energy of the load, a sub-step S114 is performed. In the sub-step S114, the voltage on the high voltage DC transmission grid 21 is converted into the second AC voltage with a first voltage level by the bidirectional AC/DC conversion module 13. After the sub-step S114, a sub-step S115 is performed. In the sub-step S115, the second AC voltage is decreased to the first AC voltage. After the sub-step S115, a sub-step S116 is performed. In the sub-step S116, the first AC voltage is converted into a DC charging voltage by the bidirectional inverter module 11. Consequently, the energy storage element 10 is charged by the DC charging voltage.

Figure 20:
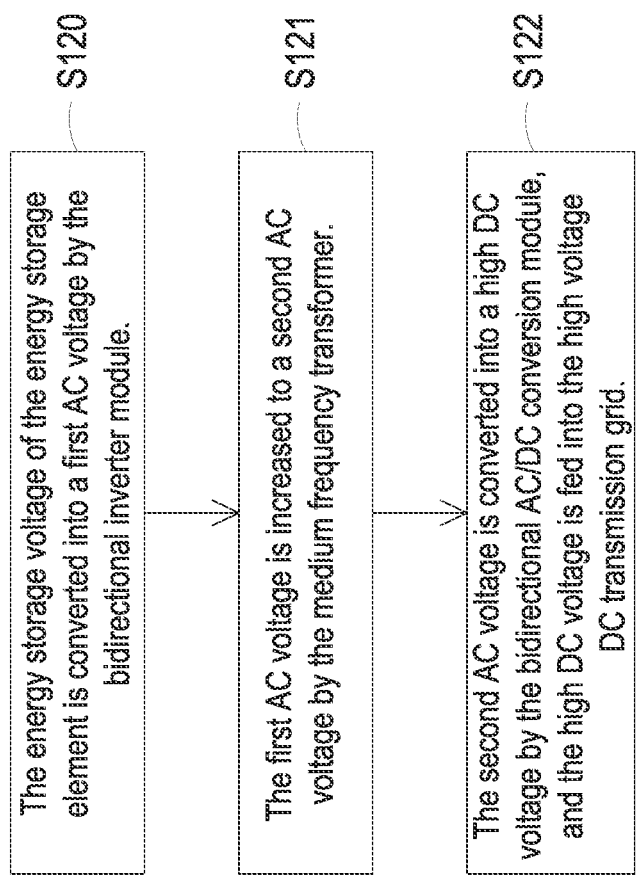
FIG. 20 is a flowchart illustrating the step S12 of the control method as shown in FIG. 18.

FIG. 20 is a flowchart illustrating the step S12 of the control method as shown in FIG. 18. The step S12 includes the following sub-steps. Firstly, in a sub-step S120, the energy storage voltage of the energy storage element 10 is converted into the first AC voltage by the bidirectional inverter module 11. After the sub-step S120, a sub-step S121 is performed. In the sub-step S121, the first AC voltage is increased to the second AC voltage by the medium frequency transformer 12. After the sub-step S121, a sub-step S122 is performed. In the sub-step S122, the second AC voltage is converted into a high DC voltage by the bidirectional AC/DC conversion module 13, and the high DC voltage is fed into the high voltage DC transmission grid 21 to provide the auxiliary electric energy to the power generator 20. In case that the capacity of the energy storage device 1 is sufficiently large, the DC power fed into the high voltage DC transmission grid 21 is transmitted to the high voltage DC substation 220 in order to power the downstream power equipment 221.

From the above descriptions, the present disclosure provides an energy storage device, a power system and a control method. The energy storage device uses a medium frequency transformer. Consequently, the volume and cost of the transformer are reduced. Moreover, since the bidirectional AC/DC conversion module is connected with the medium frequency transformer, the volume and cost of the bidirectional AC/DC conversion module are also reduced. Consequently, the volume and the cost of the energy storage device are reduced.

Moreover, by using the energy storage device, the electric energy of the electric grid is dispatched and regulated flexibly, and the peak-shaving and valley-filling function, the function of smoothing the new energy source and the function of providing fixed output power are achieved. When the power generator does not generate electric energy, the energy storage device provides auxiliary electric energy to the power generator to ensure that the power generator is started at any time.

In summary, the present disclosure provides a power system and a control method thereof. The power system uses high voltage DC power transmission so that the cost and the transmission loss are reduced. Moreover, by using the energy storage device, the main controller can flexibly adjust the power distribution in the power system by controlling the energy storage device, so that the control target is achieved.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An energy storage device for a power system, the energy storage device being electrically connected with a high voltage DC transmission grid, the energy storage device comprising:
   at least one energy storage element;
   at least one bidirectional inverter module, wherein a DC terminal of each bidirectional inverter module is electrically connected with the corresponding energy storage element;
   at least one medium frequency transformer, wherein a first transmission terminal of each medium frequency transformer is electrically connected with an AC terminal of the corresponding bidirectional inverter module; and
   at least one bidirectional AC/DC conversion module, wherein an AC terminal of each bidirectional AC/DC conversion module is electrically connected with a second transmission terminal of the corresponding medium frequency transformer, and a DC terminal of each bidirectional AC/DC conversion module is electrically connected with the high voltage DC transmission grid.

2. The energy storage device according to claim 1, wherein a working frequency of each medium frequency transformer is 400 Hz.

3. The energy storage device according to claim 1, wherein the power system further comprises a power generator, and the power generator is electrically connected with the high voltage DC transmission grid, wherein when the power generator generates electric energy, the energy storage device is operated in a grid-connected mode, and when the power generator does not generate electric energy, the energy storage device is operated in an off-grid mode and provides auxiliary electric energy to the power generator.

4. The energy storage device according to claim 3, wherein each bidirectional AC/DC conversion module comprises a modular multilevel converter and a first controller electrically connected with the modular multilevel converter;
   wherein when the energy storage device is operated in the grid-connected mode, the first controller controls a switching operation of the modular multilevel converter to adjust a voltage on the second transmission terminal of the medium frequency transformer to a medium frequency high AC voltage, and when the energy storage device is operated in the off-grid mode, the first controller controls the switching operation of the modular multilevel converter to adjust a voltage on a DC terminal of the modular multilevel converter;
   wherein a frequency of the medium frequency high AC voltage is equal to a working frequency of the medium frequency transformer.

5. The energy storage device according to claim 4, wherein when the energy storage device is operated in the grid-connected mode, the first controller performs a control method, which comprises steps of:
   (a) adjusting the voltage on the second transmission terminal of the medium frequency transformer according to a set voltage value on the second transmission terminal of the medium frequency transformer, thereby generating a current command;
   (b) adjusting a current on the second transmission terminal of the medium frequency transformer according to the current command, thereby generating a control signal; and
   (c) generating a pulse width modulation signal according to the control signal, and controlling the switching operation of the modular multilevel converter according to the pulse width modulation signal.

6. The energy storage device according to claim 4, wherein when the energy storage device is operated in the off-grid mode, the first controller performs a control method, which comprises steps of:
   (a) adjusting the voltage on the DC terminal of the modular multilevel converter according to a rated voltage of the high voltage DC transmission grid, thereby generating a current command;
   (b) adjusting a current on an AC terminal of the modular multilevel converter according to the current command, thereby generating a control signal; and
   (c) generating a pulse width modulation signal according to the control signal, and controlling the switching operation of the modular multilevel converter according to the pulse width modulation signal.

7. The energy storage device according to claim 4, wherein each bidirectional inverter module comprises an inverter and a second controller electrically connected with the inverter, wherein when the energy storage device is operated in the grid-connected mode, the second controller controls a switching operation of the inverter to adjust a conversion power of the bidirectional inverter module, and when the energy storage device is operated in the off-grid mode, the second controller controls the switching operation of the inverter to adjust a voltage on the AC terminal of the bidirectional inverter module;

wherein a frequency of the voltage on the AC terminal of the bidirectional inverter module is equal to a working frequency of the medium frequency transformer.

8. The energy storage device according to claim 7, wherein when the energy storage device is operated in the grid-connected mode, the second controller performs a control method, which comprises steps of:

(a) adjusting the conversion power of the bidirectional inverter module according to a target power of the bidirectional inverter module, thereby generating a current command;

(b) adjusting a current on the AC terminal of the bidirectional inverter module according to the current command, thereby generating a control signal; and (c) generating a pulse width modulation signal according to the control signal, and controlling the switching operation of the inverter according to the pulse width modulation signal.

9. The energy storage device according to claim 7, wherein when the energy storage device is operated in the off-grid mode, the second controller performs a control method, which comprises steps of:

(a) adjusting the voltage on the AC terminal of the bidirectional inverter module according to a set voltage value on the AC terminal of the bidirectional inverter module, thereby generating a current command;

(b) adjusting a current on the AC terminal of the bidirectional inverter module according to the current command, thereby generating a control signal; and (c) generating a pulse width modulation signal according to the control signal, and controlling the switching operation of the inverter according to the pulse width modulation signal.

10. The energy storage device according to claim 3, wherein the second transmission terminal of each medium frequency transformer comprises a plurality of windings, and each bidirectional AC/DC conversion module comprises a plurality of serially-connected converters;

wherein each of the plurality of windings is electrically connected with the corresponding converter, and each of the plurality of converters comprises a switch circuit and a first controller electrically connected with the corresponding switch circuit;

wherein when the energy storage device is operated in the grid-connected mode, each first controller controls a switching operation of the corresponding switch circuit to adjust a power on the corresponding winding of the second transmission terminal of the medium frequency transformer, and when the energy storage device is operated in the off-grid mode, the each first controller controls the switching operation of the corresponding switch circuit to adjust a voltage on a DC side of the corresponding converter.

11. The energy storage device according to claim 10, wherein when the energy storage device is operated in the grid-connected mode, the each first controller performs a control method, which comprises steps of:

(a) adjusting the power on the corresponding winding of the second transmission terminal of the medium frequency transformer according to a target power of the corresponding converter, thereby generating a current command;

(b) adjusting a current on the corresponding winding of the second transmission terminal of the medium frequency transformer according to the current command, thereby generating a control signal; and (c) generating a pulse width modulation signal according to the control signal, and controlling the switching operation of the corresponding switch circuit according to the pulse width modulation signal.

12. The energy storage device according to claim 10, wherein when the energy storage device is operated in the off-grid mode, the first controller performs a control method, which comprises steps of:

(a) adjusting the voltage on the DC side of the corresponding converter according to a target voltage on the DC side of the corresponding converter, thereby generating a current command;

(b) adjusting a current on the corresponding winding of the second transmission terminal of the medium frequency transformer according to the current command, thereby generating a control signal; and (c) generating a pulse width modulation signal according to the control signal, and controlling the switching operation of the corresponding switch circuit according to the pulse width modulation signal.

13. The energy storage device according to claim 10, wherein each bidirectional inverter module comprises an inverter and a second controller electrically connected with the inverter, wherein the second controller controls a switching operation of the inverter to adjust a voltage on the AC terminal of the bidirectional inverter module, wherein a frequency of the voltage on the AC terminal of the bidirectional inverter module is equal to a working frequency of the medium frequency transformer.

14. The energy storage device according to claim 13, wherein the second controller performs a control method, which comprises steps of:

(a) adjusting the voltage on the AC terminal of the bidirectional inverter module according to a set voltage value on the AC terminal of the bidirectional inverter module, thereby generating a current command;

(b) adjusting a current on the AC terminal of the bidirectional inverter module according to the current command, thereby generating a control signal; and (c) generating a pulse width modulation signal according to the control signal, and controlling the switching operation of the inverter according to the pulse width modulation signal.

15. The energy storage device according to claim 1, wherein the at least one energy storage element includes a plurality of energy storage elements, the at least one bidirectional inverter module includes a plurality of bidirectional inverter modules, and the at least one medium frequency transformer includes a plurality of medium frequency transformers, wherein each energy storage element, the corresponding bidirectional inverter module and the corresponding medium frequency transformer are collaboratively formed as an energy storage unit, wherein the second transmission terminals of the medium frequency transformers of the plurality of energy storage units are electrically connected with the AC terminal of the bidirectional AC/DC conversion module.

16. The energy storage device according to claim 1, wherein the at least one energy storage element includes a plurality of energy storage elements, and the at least one bidirectional inverter module includes a plurality of bidirectional inverter modules, wherein each energy storage element is electrically connected with the DC terminal of the corresponding bidirectional inverter module, the AC terminals of the plurality of bidirectional inverter modules are electrically connected with the first transmission terminal of the medium frequency transformer, and the second transmission terminal of the medium frequency transformer is electrically connected with the AC terminal of the bidirectional AC/DC conversion module.

17. The energy storage device according to claim 1, wherein the at least one energy storage element includes a plurality of energy storage elements, and the at least one bidirectional inverter module includes a plurality of bidirectional inverter modules, wherein each energy storage element is electrically connected with the DC terminal of the corresponding bidirectional inverter module, and the first transmission terminal of the medium frequency transformer comprises a plurality of windings, wherein each winding is electrically connected with the AC terminal of the corresponding bidirectional inverter module, and the second transmission terminal of the medium frequency transformer is electrically connected with the AC terminal of the bidirectional AC/DC conversion module.

18. The energy storage device according to claim 1, wherein the at least one energy storage element includes a plurality of energy storage elements, the at least one bidirectional inverter module includes a plurality of bidirectional inverter modules, the at least one medium frequency transformer includes a plurality of medium frequency transformers, and the at least one bidirectional AC/DC conversion module includes a plurality of bidirectional AC/DC conversion modules, wherein each energy storage element, the corresponding bidirectional inverter module, the corresponding medium frequency transformer and the corresponding bidirectional AC/DC conversion module are collaboratively formed as an energy storage unit, wherein the DC terminals of the bidirectional AC/DC conversion modules of the plurality of energy storage units are connected with the high voltage DC transmission grid.

19. The energy storage device according to claim 1, wherein the at least one energy storage element includes a plurality of energy storage elements, the at least one bidirectional inverter module includes a plurality of bidirectional inverter modules, the at least one medium frequency transformer includes a plurality of medium frequency transformers, and the at least one bidirectional AC/DC conversion module includes a plurality of bidirectional AC/DC conversion modules, wherein each energy storage element, the corresponding bidirectional inverter module and the corresponding medium frequency transformer are collaboratively formed as an energy storage unit, wherein the second transmission terminals of the medium frequency transformers of the plurality of energy storage units are electrically connected with each other and connected to a first AC port, and the AC terminals of the plurality of bidirectional AC/DC conversion modules are electrically connected with each other and connected to a second AC port, wherein the first AC port is electrically connected with the second AC port, and the DC terminals of the plurality of bidirectional AC/DC conversion modules are electrically connected with the high voltage DC transmission grid.

20. The energy storage device according to claim 1, wherein the at least one energy storage element includes a plurality of energy storage elements, the at least one bidirectional inverter module includes a plurality of bidirectional inverter modules, and the at least one bidirectional AC/DC conversion module includes a plurality of bidirectional AC/DC conversion modules, wherein each energy storage element is electrically connected with the DC terminal of the corresponding bidirectional inverter module, and the AC terminals of the plurality of bidirectional inverter modules are electrically connected with the first transmission terminal of the medium frequency transformer, wherein the AC terminals of the plurality of bidirectional AC/DC conversion modules are electrically connected with each other and connected to an AC port, and the second transmission terminal of the medium frequency transformer is electrically connected with the AC port.

21. The energy storage device according to claim 1, wherein the at least one energy storage element includes a plurality of energy storage elements, the at least one bidirectional inverter module includes a plurality of bidirectional inverter modules, and the at least one bidirectional AC/DC conversion module includes a plurality of bidirectional AC/DC conversion modules, wherein each energy storage element is electrically connected with the DC terminal of the corresponding bidirectional inverter module, and the first transmission terminal of the medium frequency transformer comprises a plurality of windings, wherein each winding is electrically connected with the AC terminal of the corresponding bidirectional inverter module, the AC terminals of the plurality of bidirectional AC/DC conversion modules are electrically connected with each other and connected to an AC port, and the second transmission terminal of the medium frequency transformer is electrically connected with the AC port.

22. The energy storage device according to claim 1, wherein the at least one bidirectional AC/DC conversion module includes a plurality of bidirectional AC/DC conversion modules, wherein one of the plurality of bidirectional AC/DC conversion modules is a master bidirectional AC/DC conversion module, and the others of the plurality of bidirectional AC/DC conversion modules are slave bidirectional AC/DC conversion modules, wherein the master bidirectional AC/DC conversion module provides a control command to the slave bidirectional AC/DC conversion modules.

23. The energy storage device according to claim 1, wherein each bidirectional AC/DC conversion module comprises a medium frequency modular multilevel converter, or each bidirectional AC/DC conversion module comprises a plurality of medium frequency converters.

24. A power system, comprising:
a power generator electrically connected with a high voltage DC transmission grid; and
an energy storage device electrically connected with the high voltage DC transmission grid, and comprising:
at least one energy storage element;
at least one bidirectional inverter module, wherein a DC terminal of each bidirectional inverter module is electrically connected with the corresponding energy storage element;
at least one medium frequency transformer, wherein a first transmission terminal of each medium frequency transformer is electrically connected with an AC terminal of the corresponding bidirectional inverter module; and
at least one bidirectional AC/DC conversion module, wherein an AC terminal of each bidirectional AC/DC conversion module is electrically connected with a second transmission terminal of the corresponding medium frequency transformer, and a DC terminal of each bidirectional AC/DC conversion module is electrically connected with the high voltage DC transmission grid.

25. A control method for a power system, the power system comprising a power generator and an energy storage device, the power generator and the energy storage device being electrically connected with a high voltage DC transmission grid, the energy storage device comprising at least one energy storage element, at least one bidirectional inverter module, at least one medium frequency transformer and at least one bidirectional AC/DC conversion module, a DC terminal of each bidirectional inverter module being electrically connected with the corresponding energy storage element, a first transmission terminal of each medium frequency transformer being electrically connected with an AC terminal of the corresponding bidirectional inverter module, an AC terminal of each bidirectional AC/DC conversion module being electrically connected with a second transmission terminal of the corresponding medium frequency transformer, a DC terminal of each bidirectional AC/DC conversion module being electrically connected with the high voltage DC transmission grid, the control method comprising steps of:
- (S1) determining an operation mode of the energy storage device;
- (S2) when the power generator generates electric energy, determining that the energy storage device is operated in a grid-connected mode, and allowing the energy storage device to regulate electric energy in the high voltage DC transmission grid; and
- (S3) when the power generator does not generate electric energy, determining that the energy storage device is operated in an off-grid mode, and allowing the energy storage device to provide auxiliary electric energy to the power generator.

26. The control method according to claim 25, wherein the step (S2) comprises steps of:
- (a) determining whether the electric energy provided by the power generator is greater than a required electric energy of a load;
- (b) when a determining result of the step (a) indicates that the electric energy provided by the power generator is lower than the required electric energy of the load, converting an energy storage voltage of the energy storage element into a first AC voltage by the bidirectional inverter module;
- (c) increasing the first AC voltage to a second AC voltage by the medium frequency transformer;
- (d) converting the second AC voltage into a high DC voltage by the bidirectional AC/DC conversion module, and feeding the high DC voltage into the high voltage DC transmission grid;
- (e) when the determining result of the step (a) indicates that the electric energy provided by the power generator is greater than the required electric energy of the load, converting a voltage on the high voltage DC transmission grid into the second AC voltage by the bidirectional AC/DC conversion module;
- (f) decreasing the second AC voltage to the first AC voltage; and
- (g) converting the first AC voltage into a DC charging voltage by the bidirectional inverter module, so that the energy storage element is charged by the DC charging voltage.

27. The control method according to claim 25, wherein the step (S3) comprises steps of:
- (a) converting an energy storage voltage of the energy storage element into a first AC voltage by the bidirectional inverter module;
- (b) increasing the first AC voltage to a second AC voltage by the medium frequency transformer; and
- (c) converting the second AC voltage into a high DC voltage by the bidirectional AC/DC conversion module, and feeding the high DC voltage into the high voltage DC transmission grid.

* * * * *